US012808984B2

United States Patent
(12) United States Patent
Amadjikpe

(10) Patent No.: US 12,808,984 B2
(45) Date of Patent: Nov. 24, 2026

(54) APPARATUS, SYSTEM AND METHOD OF RADAR ANTENNA CALIBRATION

(71) Applicant: INTEL CORPORATION, Santa Clara, CA (US)

(72) Inventor: Arnaud Amadjikpe, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 639 days.

(21) Appl. No.: 18/014,639

(22) PCT Filed: Jun. 22, 2021

(86) PCT No.: PCT/US2021/038480
§ 371 (c)(1),
(2) Date: Jan. 5, 2023

(87) PCT Pub. No.: WO2022/055590
PCT Pub. Date: Mar. 17, 2022

(65) Prior Publication Data

US 2023/0258768 A1 Aug. 17, 2023

Related U.S. Application Data

(60) Provisional application No. 63/061,846, filed on Aug. 6, 2020.

(51) Int. Cl.

| | |
|---|---|
| ***G01S 7/40*** | (2006.01) |
| ***G01S 13/87*** | (2006.01) |
| ***H04B 7/0413*** | (2017.01) |

(52) U.S. Cl.
CPC ................ *G01S 7/40* (2013.01); *G01S 13/87* (2013.01); *H04B 7/0413* (2013.01)

(58) Field of Classification Search
CPC . G01S 13/87; G01S 7/40; G01S 7/038; G01S 7/4017; G01S 2013/93271;
(Continued)

(56) References Cited

U.S. PATENT DOCUMENTS

| | | | | |
|---|---|---|---|---|
| 9,791,552 | B1 * | 10/2017 | Schuman | H01Q 3/267 |
| 10,193,236 | B1 * | 1/2019 | Lee | H01Q 21/24 |

(Continued)

FOREIGN PATENT DOCUMENTS

| | | | | |
|---|---|---|---|---|
| CN | 110326227 B | * | 4/2022 | H01Q 3/2605 |
| CN | 110780265 B | * | 8/2024 | H01Q 1/38 |
| WO | 2020/037321 | | 2/2020 | |

OTHER PUBLICATIONS

Arnold, B. "The Effects of Antenna Coupling in a MIMO Radar System" (2016). Theses and Dissertations, pp. 1-58 (Year: 2016).*

(Continued)

*Primary Examiner* — Vladimir Magloire
*Assistant Examiner* — Kimberly Jenkins
(74) *Attorney, Agent, or Firm* — Shichrur & Co.

(57) ABSTRACT

For example, a radar apparatus may include a processor configured to generate radar information based on input radar data, the input radar data based on radar signals of a Multiple-Input-Multiple-Output (MIMO) radar antenna, wherein the processor is configured to generate the radar information by calibrating an antenna Mismatch (MM) of the MIMO radar antenna in a first dimension of an Azimuth-Elevation domain according to a plurality of one-dimensional (1D) Inverse Coupling Matrices (ICMs), the plurality of 1D ICMs corresponding to a plurality of antenna sub-arrays of the MIMO radar antenna and to a plurality of angles in a second dimension of the Azimuth-Elevation domain.

25 Claims, 21 Drawing Sheets

(58) Field of Classification Search
CPC ........ G01S 7/285; G01S 7/352; G01S 7/4004; G01S 13/881; G01S 13/931; H04B 7/0413; H01Q 3/267
See application file for complete search history.

(56) References Cited

U.S. PATENT DOCUMENTS

| | | | | |
|---|---|---|---|---|
| 11,156,696 | B2 * | 10/2021 | Kitamura | G01S 7/032 |
| 11,486,963 | B2 * | 11/2022 | Kong | G01S 13/42 |
| 2005/0195103 | A1 * | 9/2005 | Davis | H01Q 21/22<br>342/158 |
| 2013/0207843 | A1 * | 8/2013 | McGowan | H04B 17/12<br>342/373 |
| 2013/0242773 | A1 | 9/2013 | Wernersson et al. | |
| 2014/0334565 | A1 * | 11/2014 | Tzanidis | H01Q 21/062<br>375/267 |
| 2018/0166794 | A1 * | 6/2018 | Raphaeli | G01S 13/42 |
| 2019/0324136 | A1 | 10/2019 | Amadjikpe | |
| 2020/0033445 | A1 * | 1/2020 | Raphaeli | G01S 7/4026 |
| 2020/0150220 | A1 | 5/2020 | Maor et al. | |
| 2020/0225314 | A1 | 7/2020 | Amadjikpe et al. | |
| 2020/0251832 | A1 * | 8/2020 | Kishigami | H01Q 21/08 |
| 2020/0278439 | A1 * | 9/2020 | Goto | H01Q 3/2605 |
| 2021/0025961 | A1 * | 1/2021 | Levy-Israel | G01S 7/03 |
| 2021/0265741 | A1 * | 8/2021 | Kenington | H01Q 21/24 |
| 2021/0286067 | A1 * | 9/2021 | Harnett | G01S 7/414 |
| 2021/0320425 | A1 * | 10/2021 | Arkind | H01Q 21/061 |
| 2022/0224380 | A1 * | 7/2022 | Lee | G01S 13/426 |

OTHER PUBLICATIONS

Arnold, B., et al "The Effects of Antenna Mutual Coupling on MIMO Radar System Performance", IEEE Transactions on Antennas and Propagation, vol. 67, No. 3, Mar. 2019, pp. 1410-1416 (Year: 2019).*

Steyskal et al., "Mutual coupling compensation in small array antennas", IEEE Transactions on Antennas and Propagation, vol. 38, No. 12, Dec. 1990, pp. 1971-1975.

International Search Report and the Written Opinion for International Application No. PCT/US2021/038480, mailed on Apr. 26, 2022, 8 pages.

International Preliminary Report on Patentability for International Application No. PCT/US2021/038480, mailed on Feb. 16, 2023, 5 pages.

* cited by examiner

APPARATUS, SYSTEM AND METHOD OF RADAR ANTENNA CALIBRATION

CROSS REFERENCE

This application claims the benefit of, and priority from, U.S. Provisional Patent Application No. 63/061,846 entitled "APPARATUS, SYSTEM AND METHOD OF RADAR ANTENNA CALIBRATION", filed Aug. 6, 2020, the entire disclosure of which is incorporated herein by reference.

TECHNICAL FIELD

Aspects described herein generally relate to radar antenna calibration.

BACKGROUND

Multiple Input Multiple Output (MIMO) radar is a technology that allows reduction of a physical array aperture and a number of antenna elements by transmission of orthogonal signals from a transmit (Tx) array with a plurality of elements, and processing received signals via a receive (Rx) array with a plurality of elements.

As antennas are manufactured with some enhanced phase and gain as their ground state, an antenna array may be dysfunctional without a proper calibration of antenna elements.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
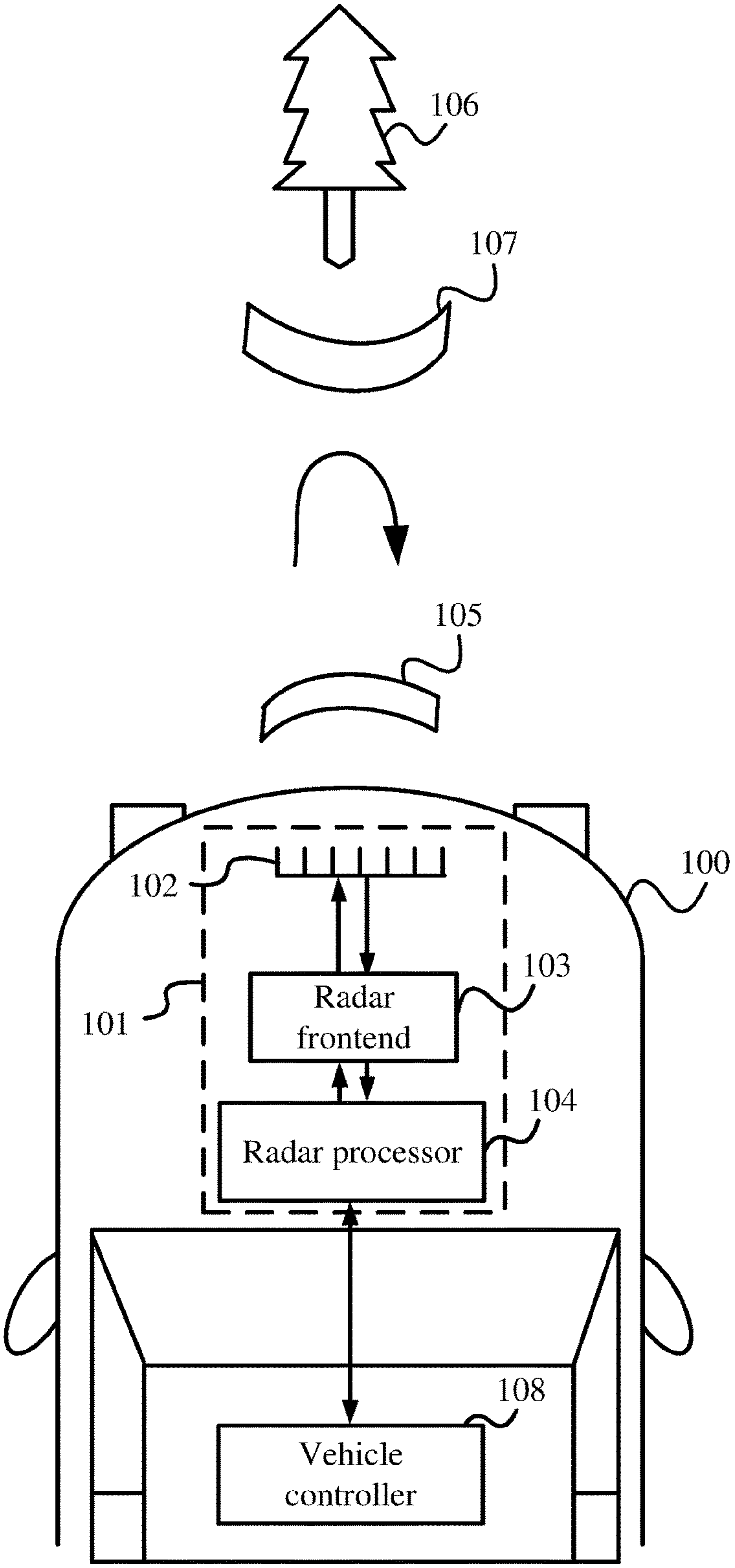
FIG. 1 is a schematic block diagram illustration of a vehicle implementing a radar, in accordance with some demonstrative aspects.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

The words "exemplary" and "demonstrative" are used herein to mean "serving as an example, instance, demonstration, or illustration". Any aspect, aspect, or design described herein as "exemplary" or "demonstrative" is not necessarily to be construed as preferred or advantageous over other aspects, aspects, or designs.

References to "one aspect", "an aspect", "demonstrative aspect", "various aspects" "one aspect", "an aspect", "demonstrative aspect", "various aspects" etc., indicate that the aspect(s) and/or aspects so described may include a particular feature, structure, or characteristic, but not every aspect or aspect necessarily includes the particular feature, structure, or characteristic. Further, repeated use of the phrase "in one aspect" or "in one aspect" does not necessarily refer to the same aspect or aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

The phrases "at least one" and "one or more" may be understood to include a numerical quantity greater than or equal to one, e.g., one, two, three, four, [ . . . ], etc. The phrase "at least one of" with regard to a group of elements may be used herein to mean at least one element from the group consisting of the elements. For example, the phrase "at least one of" with regard to a group of elements may be used herein to mean one of the listed elements, a plurality of one of the listed elements, a plurality of individual listed elements, or a plurality of a multiple of individual listed elements.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and/or may represent any information as understood in the art.

The terms "processor" or "controller" may be understood to include any kind of technological entity that allows handling of any suitable type of data and/or information. The data and/or information may be handled according to one or more specific functions executed by the processor or controller. Further, a processor or a controller may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), and the like, or any combination thereof. Any other kind of implementation of the respective functions, which will be described below in further detail, may also be understood as a processor, controller, or logic circuit. It is understood that any two (or more) processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "memory" is understood as a computer-readable medium (e.g., a non-transitory computer-readable medium) in which data or information can be stored for retrieval. References to "memory" may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" may be used to refer to any type of executable instruction and/or logic, including firmware.

A "vehicle" may be understood to include any type of driven object. By way of example, a vehicle may be a driven object with a combustion engine, an electric engine, a reaction engine, an electrically driven object, a hybrid driven object, or a combination thereof. A vehicle may be, or may include, an automobile, a bus, a mini bus, a van, a truck, a mobile home, a vehicle trailer, a motorcycle, a bicycle, a tricycle, a train locomotive, a train wagon, a moving robot, a personal transporter, a boat, a ship, a submersible, a submarine, a drone, an aircraft, a rocket, among others.

A "ground vehicle" may be understood to include any type of vehicle, which is configured to traverse the ground, e.g., on a street, on a road, on a track, on one or more rails, off-road, or the like.

An "autonomous vehicle" may describe a vehicle capable of implementing at least one navigational change without driver input. A navigational change may describe or include a change in one or more of steering, braking, acceleration/deceleration, or any other operation relating to movement, of the vehicle. A vehicle may be described as autonomous even in case the vehicle is not fully autonomous, for example, fully operational with driver or without driver input. Autonomous vehicles may include those vehicles that can operate under driver control during certain time periods, and without driver control during other time periods. Additionally or alternatively, autonomous vehicles may include vehicles that control only some aspects of vehicle navigation, such as steering, e.g., to maintain a vehicle course between vehicle lane constraints, or some steering operations under certain circumstances, e.g., not under all circumstances, but may leave other aspects of vehicle navigation to the driver, e.g., braking or braking under certain circumstances. Additionally or alternatively, autonomous vehicles may include vehicles that share the control of one or more aspects of vehicle navigation under certain circumstances, e.g., hands-on, such as responsive to a driver input; and/or vehicles that control one or more aspects of vehicle navigation under certain circumstances, e.g., hands-off, such as independent of driver input. Additionally or alternatively, autonomous vehicles may include vehicles that control one or more aspects of vehicle navigation under certain circumstances, such as under certain environmental conditions, e.g., spatial areas, roadway conditions, or the like. In some aspects, autonomous vehicles may handle some or all aspects of braking, speed control, velocity control, steering, and/or any other additional operations, of the vehicle. An autonomous vehicle may include those vehicles that can operate without a driver. The level of autonomy of a vehicle may be described or determined by the Society of Automotive Engineers (SAE) level of the vehicle, e.g., as defined by the SAE, for example in SAE J3016 2018: *Taxonomy and definitions for terms related to driving automation systems for on road motor vehicles*, or by other relevant professional organizations. The SAE level may have a value ranging from a minimum level, e.g., level 0 (illustratively, substantially no driving automation), to a maximum level, e.g., level 5 (illustratively, full driving automation).

The phrase "vehicle operation data" may be understood to describe any type of feature related to the operation of a vehicle. By way of example, "vehicle operation data" may describe the status of the vehicle, such as, the type of tires of the vehicle, the type of vehicle, and/or the age of the manufacturing of the vehicle. More generally, "vehicle operation data" may describe or include static features or static vehicle operation data (illustratively, features or data not changing over time). As another example, additionally or alternatively, "vehicle operation data" may describe or include features changing during the operation of the vehicle, for example, environmental conditions, such as weather conditions or road conditions during the operation of the vehicle, fuel levels, fluid levels, operational parameters of the driving source of the vehicle, or the like. More generally, "vehicle operation data" may describe or include varying features or varying vehicle operation data (illustratively, time varying features or data).

Some aspects may be used in conjunction with various devices and systems, for example, a radar sensor, a radar device, a radar system, a vehicle, a vehicular system, an autonomous vehicular system, a vehicular communication system, a vehicular device, an airborne platform, a waterborne platform, road infrastructure, sports-capture infrastructure, city monitoring infrastructure, static infrastructure platforms, indoor platforms, moving platforms, robot platforms, industrial platforms, a sensor device, a User Equipment (UE), a Mobile Device (MD), a wireless station (STA), a sensor device, a non-vehicular device, a mobile or portable device, and the like.

Some aspects may be used in conjunction with Radio Frequency (RF) systems, radar systems, vehicular radar systems, autonomous systems, robotic systems, detection systems, or the like.

Some demonstrative aspects may be used in conjunction with an RF frequency in a frequency band having a starting frequency above 10 Gigahertz (GHz), for example, a frequency band having a starting frequency between 10 GHz and 120 GHz. For example, some demonstrative aspects may be used in conjunction with an RF frequency having a starting frequency above 30 GHz, for example, above 45 GHz, e.g., above 60 GHz. For example, some demonstrative aspects may be used in conjunction with an automotive radar frequency band, e.g., a frequency band between 76 GHz and 81 GHz. However, other aspects may be implemented utilizing any other suitable frequency bands, for example, a frequency band above 140 GHz, a frequency band of 300 GHz, a sub Terahertz (THz) band, a THz band, an Infra Red (IR) band, and/or any other frequency band.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "communicating" as used herein with respect to a signal includes transmitting the signal and/or receiving the signal. For example, an apparatus, which is capable of communicating a signal, may include a transmitter to transmit the signal, and/or a receiver to receive the signal. The verb communicating may be used to refer to the action of transmitting or the action of receiving. In one example, the phrase "communicating a signal" may refer to the action of transmitting the signal by a transmitter, and may not necessarily include the action of receiving the signal by a receiver. In another example, the phrase "communicating a signal" may refer to the action of receiving the signal by a receiver, and may not necessarily include the action of transmitting the signal by a transmitter.

The term "antenna", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like. In one example, an antenna may be implemented as a separate element or an integrated element, for example, as an on-module antenna, an on-chip antenna, or according to any other antenna architecture.

Some demonstrative aspects are described herein with respect to RF radar signals. However, other aspects may be implemented with respect to, or in conjunction with, any other radar signals, wireless signals, IR signals, acoustic signals, optical signals, wireless communication signals, communication scheme, network, standard, and/or protocol. For example, some demonstrative aspects may be implemented with respect to systems, e.g., Light Detection Ranging (LiDAR) systems, and/or sonar systems, utilizing light and/or acoustic signals.

Reference is now made to FIG. 1, which schematically illustrates a block diagram of a vehicle 100 implementing a radar, in accordance with some demonstrative aspects.

In some demonstrative aspects, vehicle 100 may include a car, a truck, a motorcycle, a bus, a train, an airborne vehicle, a waterborne vehicle, a cart, a golf cart, an electric cart, a road agent, or any other vehicle.

In some demonstrative aspects, vehicle 100 may include a radar device 101, e.g., as described below. For example, radar device 101 may include a radar detecting device, a radar sensing device, a radar sensor, or the like, e.g., as described below.

In some demonstrative aspects, radar device 101 may be implemented as part of a vehicular system, for example, a system to be implemented and/or mounted in vehicle 100.

In one example, radar device 101 may be implemented as part of an autonomous vehicle system, an automated driving system, a driver assistance and/or support system, and/or the like.

For example, radar device 101 may be installed in vehicle 101 for detection of nearby objects, e.g., for autonomous driving.

In some demonstrative aspects, radar device 101 may be configured to detect targets in a vicinity of vehicle 100, e.g., in a far vicinity and/or a near vicinity, for example, using RF and analog chains, capacitor structures, large spiral transformers and/or any other electronic or electrical elements, e.g., as described below. In one example, radar device 101 may be mounted onto, placed, e.g., directly, onto, or attached to, vehicle 100.

In some demonstrative aspects, vehicle 100 may include a single radar device 101. In other aspects, vehicle 100 may include a plurality of radar devices 101, for example, at a plurality of locations, e.g., around vehicle 100.

In some demonstrative aspects, radar device 101 may be implemented as a component in a suite of sensors used for driver assistance and/or autonomous vehicles, for example, due to the ability of radar to operate in nearly all-weather conditions.

In some demonstrative aspects, radar device 101 may be configured to support autonomous vehicle usage, e.g., as described below.

In one example, radar device 101 may determine a class, a location, an orientation, a velocity, an intention, a perceptional understanding of the environment, and/or any other information corresponding to an object in the environment.

In another example, radar device 101 may be configured to determine one or more parameters and/or information for one or more operations and/or tasks, e.g., path planning, and/or any other tasks.

In some demonstrative aspects, radar device 101 may be configured to map a scene by measuring targets' echoes (reflectivity) and discriminating them, for example, mainly in range, velocity, azimuth and/or elevation, e.g., as described below.

In some demonstrative aspects, radar device 101 may be configured to detect, and/or sense, one or more objects, which are located in a vicinity, e.g., a far vicinity and/or a near vicinity, of the vehicle 100, and to provide one or more parameters, attributes, and/or information with respect to the objects.

In some demonstrative aspects, the objects may include other vehicles; pedestrians; traffic signs; traffic lights; roads, road elements, e.g., a pavement-road meeting, an edge line; a hazard, e.g., a tire, a box, a crack in the road surface; and/or the like.

In some demonstrative aspects, the one or more parameters, attributes and/or information with respect to the object may include a range of the objects from the vehicle 100, an angle of the object with respect to the vehicle 100, a location of the object with respect to the vehicle 100, a relative speed of the object with respect to vehicle 100, and/or the like.

In some demonstrative aspects, radar device 101 may include a Multiple Input Multiple Output (MIMO) radar device 101, e.g., as described below. In one example, the MIMO radar device may be configured to utilize "spatial filtering" processing, for example, beamforming and/or any other mechanism, for one or both of Transmit (Tx) signals and/or Receive (Rx) signals.

Some demonstrative aspects are described below with respect to a radar device, e.g., radar device 101, implemented as a MIMO radar. However, in other aspects, radar device 101 may be implemented as any other type of radar utilizing a plurality of antenna elements, e.g., a Single Input Multiple Output (SIMO) radar or a Multiple Input Single output (MISO) radar.

Some demonstrative aspects may be implemented with respect to a radar device, e.g., radar device 101, implemented as a MIMO radar, e.g., as described below. However, in other aspects, radar device 101 may be implemented as any other type of radar, for example, an Electronic Beam Steering radar, a Synthetic Aperture Radar (SAR), adaptive and/or cognitive radars that change their transmission according to the environment and/or ego state, a reflect array radar, or the like.

In some demonstrative aspects, radar device 101 may include an antenna arrangement 102, a radar frontend 103 configured to communicate radar signals via the antenna arrangement 102, and a radar processor 104 configured to generate radar information based on the radar signals, e.g., as described below.

In some demonstrative aspects, radar processor 104 may be configured to process radar information of radar device 101 and/or to control one or more operations of radar device 101, e.g., as described below.

In some demonstrative aspects, radar processor 104 may include, or may be implemented, partially or entirely, by circuitry and/or logic, e.g., one or more processors including circuitry and/or logic, memory circuitry and/or logic. Additionally or alternatively, one or more functionalities of radar processor 104 may be implemented by logic, which may be executed by a machine and/or one or more processors, e.g., as described below.

In one example, radar processor 104 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In other aspects, radar processor 104 may be implemented by one or more additional or alternative elements of vehicle 100.

In some demonstrative aspects, radar frontend 103 may include, for example, one or more (radar) transmitters, and a one or more (radar) receivers, e.g., as described below.

In some demonstrative aspects, antenna arrangement 102 may include a plurality of antennas to communicate the radar signals. For example, antenna arrangement 102 may include multiple transmit antennas in the form of a transmit antenna array, and multiple receive antennas in the form of a receive antenna array. In another example, antenna arrangement 102 may include one or more antennas used both as transmit and receive antennas. In the latter case, the radar frontend 103, for example, may include a duplexer, e.g., a circuit to separate transmitted signals from received signals.

In some demonstrative aspects, as shown in FIG. 1, the radar frontend 103 and the antenna arrangement 102 may be controlled, e.g., by radar processor 104, to transmit a radio transmit signal 105.

In some demonstrative aspects, as shown in FIG. 1, the radio transmit signal 105 may be reflected by an object 106, resulting in an echo 107.

In some demonstrative aspects, the radar device 101 may receive the echo 107, e.g., via antenna arrangement 102 and radar frontend 103, and radar processor 104 may generate radar information, for example, by calculating information about position, radial velocity (Doppler), and/or direction of the object 106, e.g., with respect to vehicle 100.

In some demonstrative aspects, radar processor 104 may be configured to provide the radar information to a vehicle controller 108 of the vehicle 100, e.g., for autonomous driving of the vehicle 100.

In some demonstrative aspects, at least part of the functionality of radar processor 104 may be implemented as part of vehicle controller 108. In other aspects, the functionality of radar processor 104 may be implemented as part of any other element of radar device 101 and/or vehicle 100. In other aspects, radar processor 104 may be implemented, as a separate part of, or as part of any other element of radar device 101 and/or vehicle 100.

In some demonstrative aspects, vehicle controller 108 may be configured to control one or more functionalities, modes of operation, components, devices, systems and/or elements of vehicle 100.

In some demonstrative aspects, vehicle controller 108 may be configured to control one or more vehicular systems of vehicle 100, e.g., as described below.

In some demonstrative aspects, the vehicular systems may include, for example, a steering system, a braking system, a driving system, and/or any other system of the vehicle 100.

In some demonstrative aspects, vehicle controller 108 may configured to control radar device 101, and/or to process one or parameters, attributes and/or information from radar device 101.

In some demonstrative aspects, vehicle controller 108 may be configured, for example, to control the vehicular systems of the vehicle 100, for example, based on radar information from radar device 101 and/or one or more other sensors of the vehicle 100, e.g., Light Detection and Ranging (LIDAR) sensors, camera sensors, and/or the like.

In one example, vehicle controller 108 may control the steering system, the braking system, and/or any other vehicular systems of vehicle 100, for example, based on the information from radar device 101, e.g., based on one or more objects detected by radar device 101.

In other aspects, vehicle controller 108 may be configured to control any other additional or alternative functionalities of vehicle 100.

Some demonstrative aspects are described herein with respect to a radar device 101 implemented in a vehicle, e.g., vehicle 100. In other aspects a radar device, e.g., radar device 101, may be implemented as part of any other element of a traffic system or network, for example, as part of a road infrastructure, and/or any other element of a traffic network or system. Other aspects may be implemented with respect to any other system, environment and/or apparatus, which may be implemented in any other object, environment, location, or place. For example, radar device 101 may be part of a non-vehicular device, which may be implemented, for example, in an indoor location, a stationary infrastructure outdoors, or any other location.

In some demonstrative aspects, radar device 101 may be configured to support security usage. In one example, radar device 101 may be configured to determine a nature of an operation, e.g., a human entry, an animal entry, an environmental movement, and the like, to identity a threat level of a detected event, and/or any other additional or alternative operations.

Some demonstrative aspects may be implemented with respect to any other additional or alternative devices and/or systems, for example, for a robot, e.g., as described below.

In other aspects, radar device 101 may be configured to support any other usages and/or applications.

Figure 2:
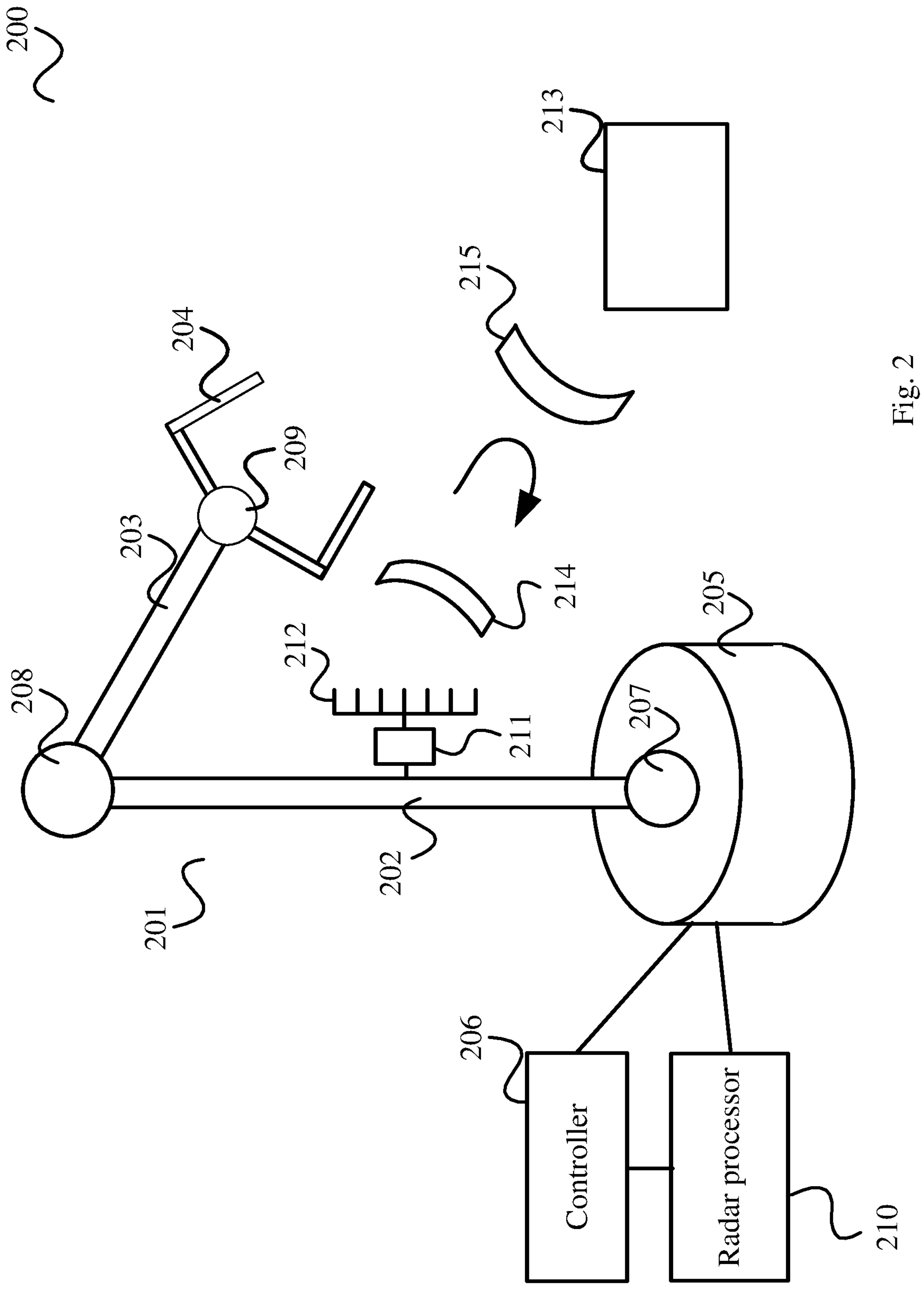
FIG. 2 is a schematic block diagram illustration of a robot implementing a radar, in accordance with some demonstrative aspects.

Reference is now made to FIG. 2, which schematically illustrates a block diagram of a robot 200 implementing a radar, in accordance with some demonstrative aspects.

In some demonstrative aspects, robot 200 may include a robot arm 201. The robot 200 may be implemented, for example, in a factory for handling an object 213, which may be, for example, a part that should be affixed to a product that is being manufactured. The robot arm 201 may include a plurality of movable members, for example, movable members 202, 203, 204, and a support 205. Moving the movable members 202, 203, and/or 204 of the robot arm 201, e.g., by actuation of associated motors, may allow physical interaction with the environment to carry out a task, e.g., handling the object 213.

In some demonstrative aspects, the robot arm 201 may include a plurality of joint elements, e.g., joint elements 207, 208, 209, which may connect, for example, the members 202, 203, and/or 204 with each other, and with the support 205. For example, a joint element 207, 208, 209 may have one or more joints, each of which may provide rotatable motion, e.g., rotational motion, and/or translatory motion, e.g., displacement, to associated members and/or motion of members relative to each other. The movement of the members 202, 203, 204 may be initiated by suitable actuators.

In some demonstrative aspects, the member furthest from the support 205, e.g., member 204, may also be referred to as the end-effector 204 and may include one or more tools, such as, a claw for gripping an object, a welding tool, or the like. Other members, e.g., members 202, 203, closer to the support 205, may be utilized to change the position of the end-effector 204, e.g., in three-dimensional space. For example, the robot arm 201 may be configured to function similarly to a human arm, e.g., possibly with a tool at its end.

In some demonstrative aspects, robot 200 may include a (robot) controller 206 configured to implement interaction with the environment, e.g., by controlling the robot arm's actuators, according to a control program, for example, in order to control the robot arm 201 according to the task to be performed.

In some demonstrative aspects, an actuator may include a component adapted to affect a mechanism or process in response to being driven. The actuator can respond to commands given by the controller 206 (the so-called activation) by performing mechanical movement. This means that an actuator, typically a motor (or electromechanical converter), may be configured to convert electrical energy into mechanical energy when it is activated (i.e. actuated).

In some demonstrative aspects, controller 206 may be in communication with a radar processor 210 of the robot 200.

In some demonstrative aspects, a radar fronted 211 and a radar antenna arrangement 212 may be coupled to the radar processor 210. In one example, radar fronted 211 and/or radar antenna arrangement 212 may be included, for example, as part of the robot arm 201.

In some demonstrative aspects, the radar frontend 211, the radar antenna arrangement 212 and the radar processor 210 may be operable as, and/or may be configured to form, a radar device. For example, antenna arrangement 212 may be configured to perform one or more functionalities of antenna arrangement 102 (FIG. 1), radar frontend 211 may be configured to perform one or more functionalities of radar frontend 103 (FIG. 1), and/or radar processor 210 may be configured to perform one or more functionalities of radar processor 104 (FIG. 1), e.g., as described above.

In some demonstrative aspects, for example, the radar frontend 211 and the antenna arrangement 212 may be controlled, e.g., by radar processor 210, to transmit a radio transmit signal 214.

In some demonstrative aspects, as shown in FIG. 2, the radio transmit signal 214 may be reflected by the object 213, resulting in an echo 215.

In some demonstrative aspects, the echo 215 may be received, e.g., via antenna arrangement 212 and radar frontend 211, and radar processor 210 may generate radar information, for example, by calculating information about position, speed (Doppler) and/or direction of the object 213, e.g., with respect to robot arm 201.

In some demonstrative aspects, radar processor 210 may be configured to provide the radar information to the robot controller 206 of the robot arm 201, e.g., to control robot arm 201. For example, robot controller 206 may be configured to control robot arm 201 based on the radar information, e.g., to grab the object 213 and/or to perform any other operation.

Figure 3:
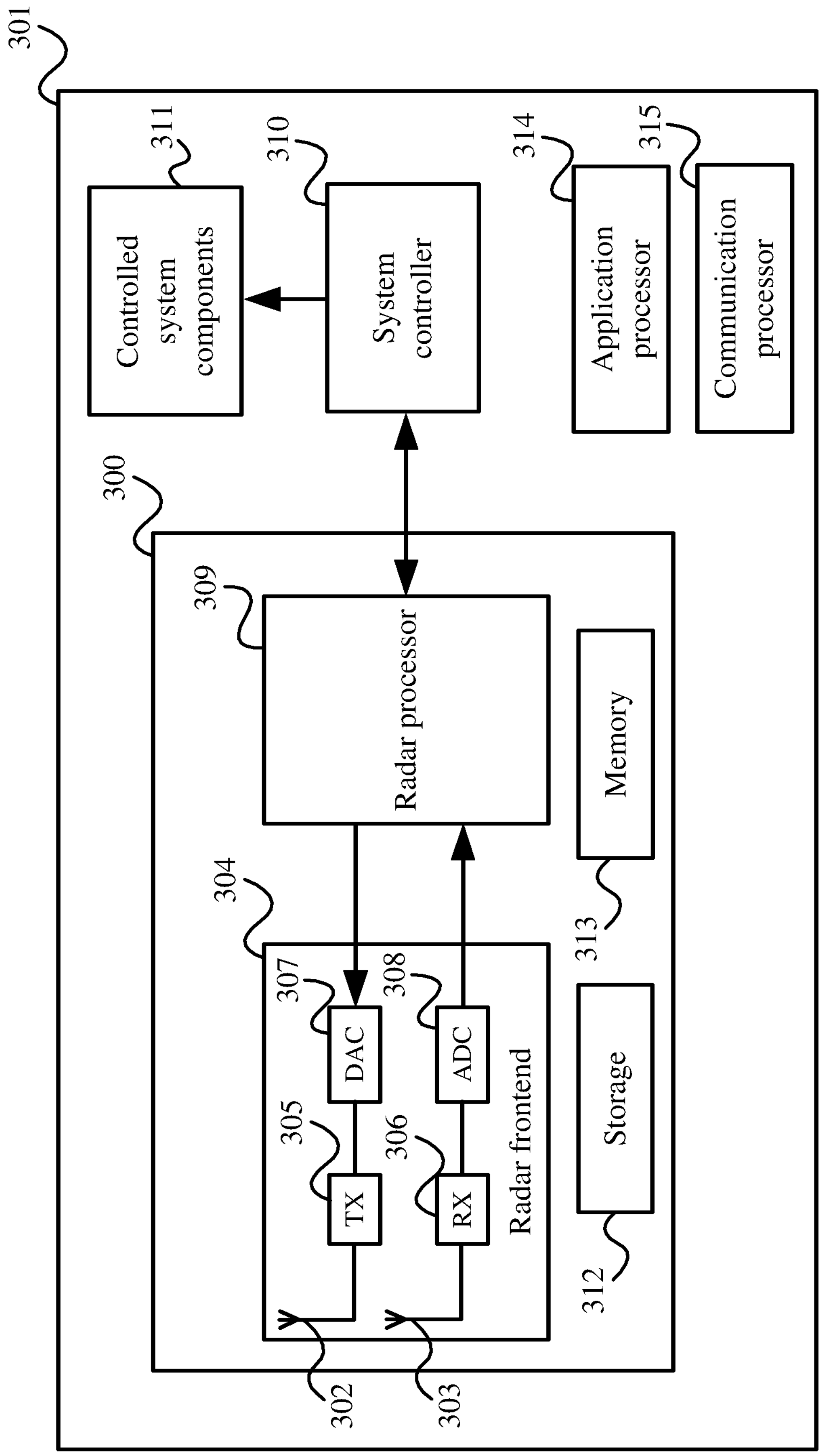
FIG. 3 is a schematic block diagram illustration of a radar apparatus, in accordance with some demonstrative aspects.

Reference is made to FIG. 3, which schematically illustrates a radar apparatus 300, in accordance with some demonstrative aspects.

In some demonstrative aspects, radar apparatus 300 may be implemented as part of a device or system 301, e.g., as described below.

For example, radar apparatus 300 may be implemented as part of, and/or may configured to perform one or more operations and/or functionalities of, the devices or systems described above with reference to FIG. 1 an/or FIG. 2. In other aspects, radar apparatus 300 may be implemented as part of any other device or system 301.

In some demonstrative aspects, radar device 300 may include an antenna arrangement, which may include one or more transmit antennas 302 and one or more receive antennas 303. In other aspects, any other antenna arrangement may be implemented.

In some demonstrative aspects, radar device 300 may include a radar frontend 304, and a radar processor 309.

In some demonstrative aspects, as shown in FIG. 3, the one or more transmit antennas 302 may be coupled with a transmitter (or transmitter arrangement) 305 of the radar frontend 304; and/or the one or more receive antennas 303 may be coupled with a receiver (or receiver arrangement) 306 of the radar frontend 304, e.g., as described below.

In some demonstrative aspects, transmitter 305 may include one or more elements, for example, an oscillator, a power amplifier and/or one or more other elements, configured to generate radio transmit signals to be transmitted by the one or more transmit antennas 302, e.g., as described below.

In some demonstrative aspects, for example, radar processor 309 may provide digital radar transmit data values to the radar frontend 304. For example, radar frontend 304 may include a Digital-to-Analog Converter (DAC) 307 to convert the digital radar transmit data values to an analog transmit signal. The transmitter 305 may convert the analog transmit signal to a radio transmit signal which is to be transmitted by transmit antennas 302.

In some demonstrative aspects, receiver 306 may include one or more elements, for example, one or more mixers, one or more filters and/or one or more other elements, configured to process, down-convert, radio signals received via the one or more receive antennas 303, e.g., as described below.

In some demonstrative aspects, for example, receiver 306 may convert a radio receive signal received via the one or more receive antennas 303 into an analog receive signal. The radar frontend 304 may include an Analog-to-Digital Converter (ADC) 308 to generate digital radar reception data values based on the analog receive signal. For example, radar frontend 304 may provide the digital radar reception data values to the radar processor 309.

In some demonstrative aspects, radar processor 309 may be configured to process the digital radar reception data values, for example, to detect one or more objects, e.g., in an environment of the device/system 301. This detection may include, for example, the determination of information including one or more of range, speed (Doppler), direction, and/or any other information, of one or more objects, e.g., with respect to the system 301.

In some demonstrative aspects, radar processor 309 may be configured to provide the determined radar information to a system controller 310 of device/system 301. For example, system controller 310 may include a vehicle controller, e.g., if device/system 301 includes a vehicular device/system, a robot controller, e.g., if device/system 301 includes a robot device/system, or any other type of controller for any other type of device/system 301.

In some demonstrative aspects, system controller 310 may be configured to control one or more controlled system components 311 of the system 301, e.g. a motor, a brake, steering, and the like, e.g. by one or more corresponding actuators.

In some demonstrative aspects, radar device 300 may include a storage 312 or a memory 313, e.g., to store information processed by radar 300, for example, digital radar reception data values being processed by the radar processor 309, radar information generated by radar processor 309, and/or any other data to be processed by radar processor 309.

In some demonstrative aspects, device/system 301 may include, for example, an application processor 314 and/or a communication processor 315, for example, to at least partially implement one or more functionalities of system controller 310 and/or to perform communication between system controller 310, radar device 300, the controlled system components 311, and/or one or more additional elements of device/system 301.

In some demonstrative aspects, radar device 300 may be configured to generate and transmit the radio transmit signal in a form, which may support determination of range, speed, and/or direction, e.g., as described below.

For example, a radio transmit signal of a radar may be configured to include a plurality of pulses. For example, a pulse transmission may include the transmission of short high-power bursts in combination with times during which the radar device listens for echoes.

For example, in order to more optimally support a highly dynamic situation, e.g., in an automotive scenario, a continuous wave (CW) may instead be used as the radio transmit signal. However, a continuous wave, e.g., with constant frequency, may support velocity determination, but may not allow range determination, e.g., due to the lack of a time mark that could allow distance calculation.

In some demonstrative aspects, radio transmit signal 105 (FIG. 1) may be transmitted according to technologies such as, for example, Frequency-Modulated continuous wave (FMCW) radar, Phase-Modulated Continuous Wave (PMCW) radar, Orthogonal Frequency Division Multiplexing (OFDM) radar, and/or any other type of radar technology, which may support determination of range, velocity, and/or direction, e.g., as described below.

Figure 4:
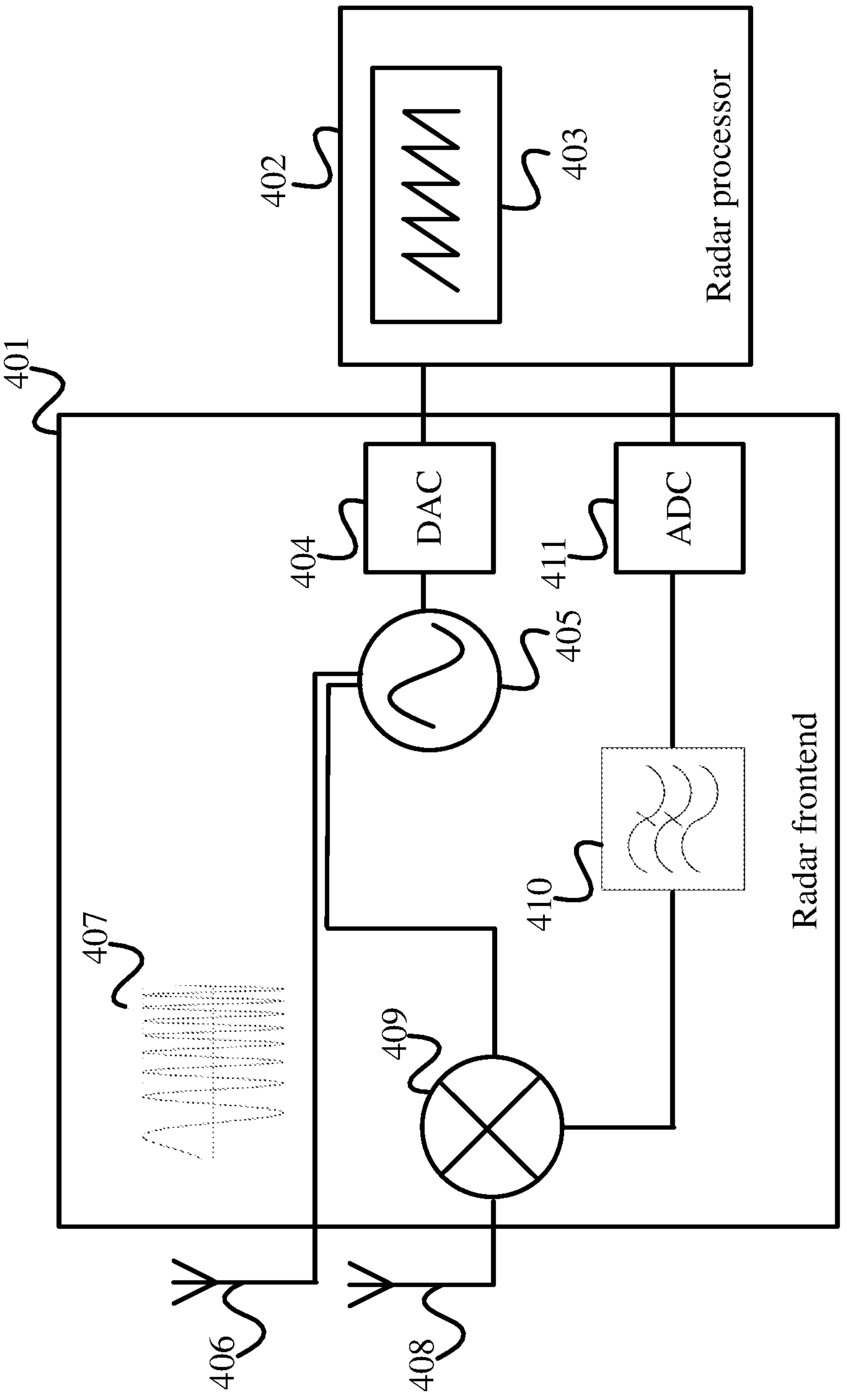
FIG. 4 is a schematic block diagram illustration of a Frequency-Modulated Continuous Wave (FMCW) radar apparatus, in accordance with some demonstrative aspects.

Reference is made to FIG. 4, which schematically illustrates a FMCW radar apparatus, in accordance with some demonstrative aspects.

In some demonstrative aspects, FMCW radar device 400 may include a radar frontend 401, and a radar processor 402. For example, radar frontend 304 (FIG. 3) may include one or more elements of, and/or may perform one or more operations and/or functionalities of, radar frontend 401; and/or radar processor 309 (FIG. 3) may include one or more elements of, and/or may perform one or more operations and/or functionalities of, radar processor 402.

In some demonstrative aspects, FMCW radar device 400 may be configured to communicate radio signals according to an FMCW radar technology, e.g., rather than sending a radio transmit signal with a constant frequency.

In some demonstrative aspects, radio frontend 401 may be configured to ramp up and reset the frequency of the transmit signal, e.g., periodically, for example, according to a saw tooth waveform 403. In other aspects, a triangle waveform, or any other suitable waveform may be used.

In some demonstrative aspects, for example, radar processor 402 may be configured to provide waveform 403 to frontend 401, for example, in digital form, e.g., as a sequence of digital values.

In some demonstrative aspects, radar frontend 401 may include a DAC 404 to convert waveform 403 into analog form, and to supply it to a voltage-controlled oscillator 405. For example, oscillator 405 may be configured to generate an output signal, which may be frequency-modulated in accordance with the waveform 403.

In some demonstrative aspects, oscillator 405 may be configured to generate the output signal including a radio transmit signal, which may be fed to and sent out by one or more transmit antennas 406.

In some demonstrative aspects, the radio transmit signal generated by the oscillator 405 may have the form of a sequence of chirps 407, which may be the result of the modulation of a sinusoid with the saw tooth waveform 403.

In one example, a chirp 407 may correspond to the sinusoid of the oscillator signal frequency-modulated by a "tooth" of the saw tooth waveform 403, e.g., from the minimum frequency to the maximum frequency.

In some demonstrative aspects, FMCW radar device 400 may include one or more receive antennas 408 to receive a radio receive signal. The radio receive signal may be based on the echo of the radio transmit signal, e.g., in addition to any noise, interference, or the like.

In some demonstrative aspects, radar frontend 401 may include a mixer 409 to mix the radio transmit signal with the radio receive signal into a mixed signal.

In some demonstrative aspects, radar frontend 401 may include a filter, e.g., a Low Pass Filter (LPF) 410, which may be configured to filter the mixed signal from the mixer 409 to provide a filtered signal. For example, radar frontend 401 may include an ADC 411 to convert the filtered signal into digital reception data values, which may be provided to radar processor 402. In another example, the filter 410 may be a digital filter, and the ADC 411 may be arranged between the mixer 409 and the filter 410.

In some demonstrative aspects, radar processor 402 may be configured to process the digital reception data values to provide radar information, for example, including range, speed (velocity/Doppler), and/or direction (AoA) information of one or more objects.

In some demonstrative aspects, radar processor 402 may be configured to perform a first Fast Fourier Transform (FFT) (also referred to as "range FFT") to extract a delay response, which may be used to extract range information, and/or a second FFT (also referred to as "Doppler FFT") to extract a Doppler shift response, which may be used to extract velocity information, from the digital reception data values.

In other aspects, any other additional or alternative methods may be utilized to extract range information. In one example, in a digital radar implementation, a correlation with the transmitted signal may be used, e.g., according to a matched filter implementation.

Figure 5:
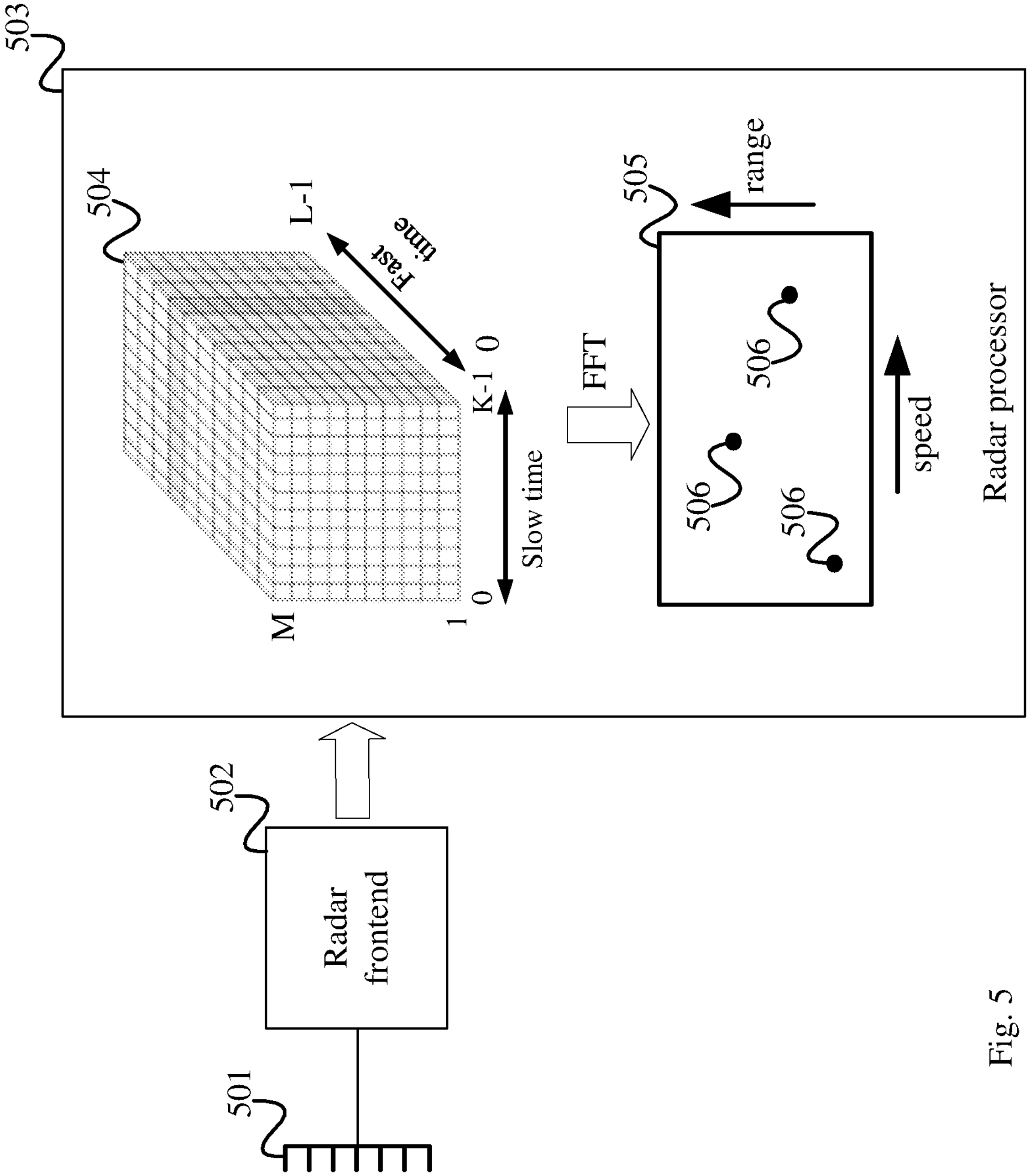
FIG. 5 is a schematic illustration of an extraction scheme, which may be implemented to extract range and speed (Doppler) estimations from digital reception radar data values, in accordance with some demonstrative aspects.

Reference is made to FIG. 5, which schematically illustrates an extraction scheme, which may be implemented to extract range and speed (Doppler) estimations from digital reception radar data values, in accordance with some demonstrative aspects. For example, radar processor 104 (FIG. 1), radar processor 210 (FIG. 2), radar processor 309 (FIG. 3), and/or radar processor 402 (FIG. 4), may be configured to extract range and/or speed (Doppler) estimations from digital reception radar data values according to one or more aspects of the extraction scheme of FIG. 5.

In some demonstrative aspects, as shown in FIG. 5, a radio receive signal, e.g., including echoes of a radio transmit signal, may be received by a receive antenna array 501. The radio receive signal may be processed by a radio radar frontend 502 to generate digital reception data values, e.g., as described above. The radio radar frontend 502 may provide the digital reception data values to a radar processor 503, which may process the digital reception data values to provide radar information, e.g., as described above.

In some demonstrative aspects, the digital reception data values may be represented in the form of a data cube 504. For example, the data cube 504 may include digitized samples of the radio receive signal, which is based on a radio signal transmitted from a transmit antenna and received by M receive antennas. In some demonstrative aspects, for example, with respect to a MIMO implementation, there may be multiple transmit antennas, and the number of samples may be multiplied accordingly.

In some demonstrative aspects, a layer of the data cube 504, for example, a horizontal layer of the data cube 504, may include samples of an antenna, e.g., a respective antenna of the M antennas.

In some demonstrative aspects, data cube 504 may include samples for K chirps. For example, as shown in FIG. 5, the samples of the chirps may be arranged in a so-called "slow time"-direction.

In some demonstrative aspects, the data cube 504 may include L samples, e.g., L=512 or any other number of samples, for a chirp, e.g., per each chirp. For example, as shown in FIG. 5, the samples per chirp may be arranged in a so-called "fast time"-direction of the data cube 504.

In some demonstrative aspects, radar processor 503 may be configured to process a plurality of samples, e.g., L samples collected for each chirp and for each antenna, by a first FFT. The first FFT may be performed, for example, for each chirp and each antenna, such that a result of the processing of the data cube 504 by the first FFT may again have three dimensions, and may have the size of the data cube 504 while including values for L range bins, e.g., instead of the values for the L sampling times.

In some demonstrative aspects, radar processor 503 may be configured to process the result of the processing of the data cube 504 by the first FFT, for example, by processing the result according to a second FFT along the chirps, e.g., for each antenna and for each range bin.

For example, the first FFT may be in the "fast time" direction, and the second FFT may be in the "slow time" direction.

In some demonstrative aspects, the result of the second FFT may provide, e.g., when aggregated over the antennas, a range/Doppler (R/D) map 505. The R/D map may have FFT peaks 506, for example, including peaks of FFT output values (in terms of absolute values) for certain range/speed combinations, e.g., for range/Doppler bins. For example, a range/Doppler bin may correspond to a range bin and a Doppler bin. For example, radar processor 503 may consider a peak as potentially corresponding to an object, e.g., of the range and speed corresponding to the peak's range bin and speed bin.

In some demonstrative aspects, the extraction scheme of FIG. 5 may be implemented for an FMCW radar, e.g., FMCW radar 400 (FIG. 4), as described above. In other aspects, the extraction scheme of FIG. 5 may be implemented for any other radar type. In one example, the radar processor 503 may be configured to determine a range/Doppler map 505 from digital reception data values of a PMCW radar, an OFDM radar, or any other radar technologies. For example, in adaptive or cognitive radar, the pulses in a frame, the waveform and/or modulation may be changed over time, e.g., according to the environment.

Referring back to FIG. 3, in some demonstrative aspects, receive antenna arrangement 303 may be implemented using a receive antenna array having a plurality of receive antennas (or receive antenna elements). For example, radar processor 309 may be configured to determine an angle of arrival of the received radio signal, e.g., echo 105 (FIG. 1) and/or echo 215 (FIG. 2). For example, radar processor 309 may be configured to determine a direction of a detected object, e.g., with respect to the device/system 301, for example, based on the angle of arrival of the received radio signal, e.g., as described below.

Figure 6:
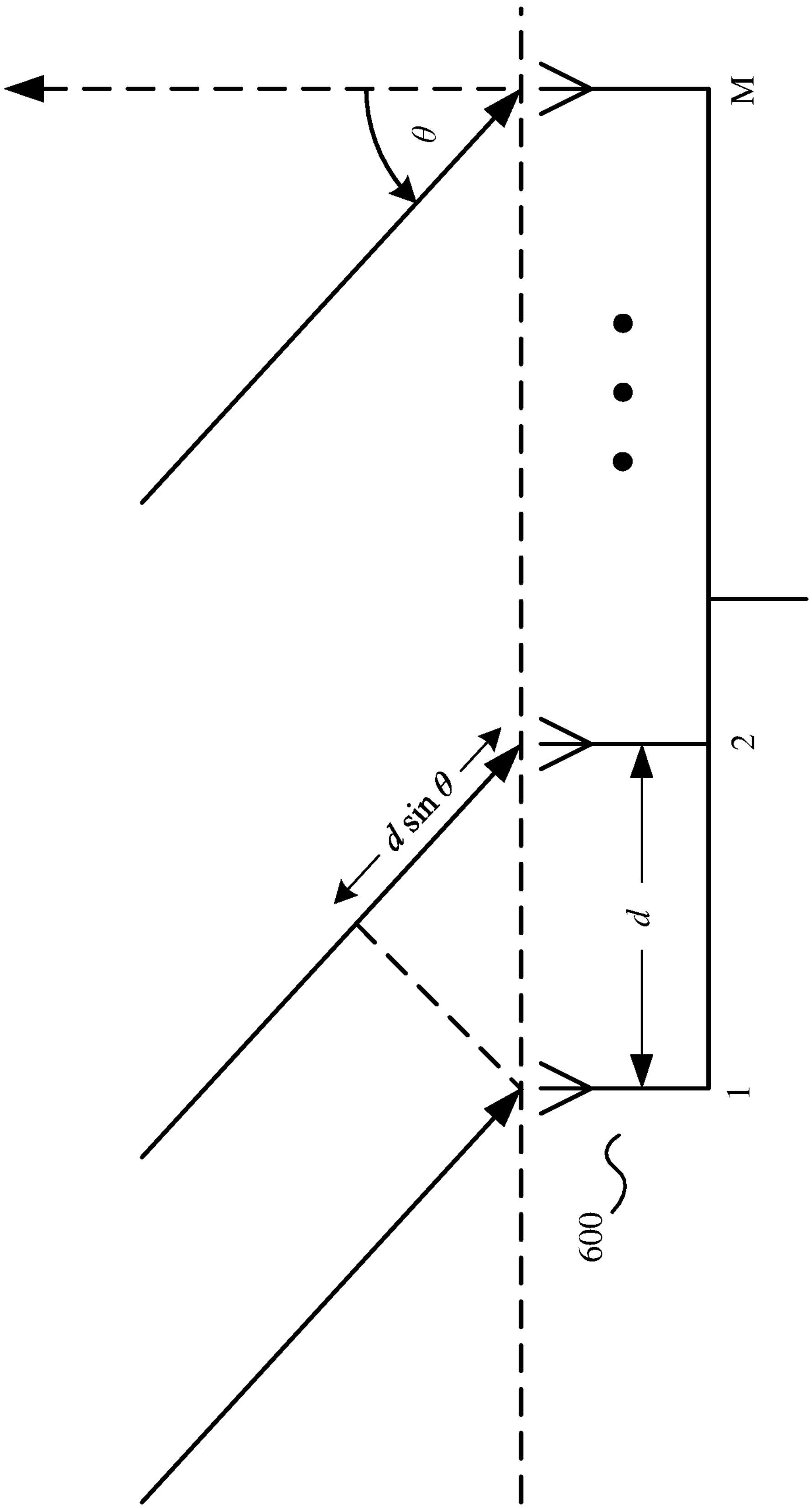
FIG. 6 is a schematic illustration of an angle-determination scheme, which may be implemented to determine Angle of Arrival (AoA) information based on an incoming radio signal received by a receive antenna array, in accordance with some demonstrative aspects.

Reference is made to FIG. 6, which schematically illustrates an angle-determination scheme, which may be implemented to determine Angle of Arrival (AoA) information based on an incoming radio signal received by a receive antenna array 600, in accordance with some demonstrative aspects.

FIG. 6 depicts an angle-determination scheme based on received signals at the receive antenna array. In some demonstrative aspects, for example, in a virtual MIMO array, the angle-determination may also be based on the signals transmitted by the array of Tx antennas.

FIG. 6 depicts a one-dimensional angle-determination scheme. Other multi-dimensional angle determination schemes, e.g., a two-dimensional scheme or a three-dimensional scheme, may be implemented.

In some demonstrative aspects, as shown in FIG. 6, the receive antenna array 600 may include M antennas (numbered, from left to right, 1 to M).

As shown by the arrows in FIG. 6, it is assumed that an echo is coming from an object located at the top left direction. Accordingly, the direction of the echo, e.g., the incoming radio signal, may be towards the bottom right. According to this example, the further to the left a receive antenna is located, the earlier it will receive a certain phase of the incoming radio signal.

For example, a phase difference, denoted $\Delta\varphi$, between two antennas of the receive antenna array 601 may be determined, e.g., as follows:

$$\Delta\varphi = \frac{2\pi}{\lambda} \cdot d \cdot \sin(\theta)$$

wherein $\lambda$ denotes a wavelength of the incoming radio signal, d denotes a distance between the two antennas, and $\theta$ denotes an angle of arrival of the incoming radio signal, e.g., with respect to a normal direction of the array.

In some demonstrative aspects, radar processor 309 (FIG. 3) may be configured to utilize this relationship between phase and angle of the incoming radio signal, for example, to determine the angle of arrival of echoes, for example by performing an FFT, e.g., a third FFT ("angular FFT") over the antennas.

In some demonstrative aspects, multiple transmit antennas, e.g., in the form of an antenna array having multiple transmit antennas, may be used, for example, to increase the spatial resolution, e.g., to provide high-resolution radar information. For example, a MIMO radar device may utilize a virtual MIMO radar antenna, which may be formed as a convolution of a plurality of transmit antennas convolved with a plurality of receive antennas.

Figure 7:
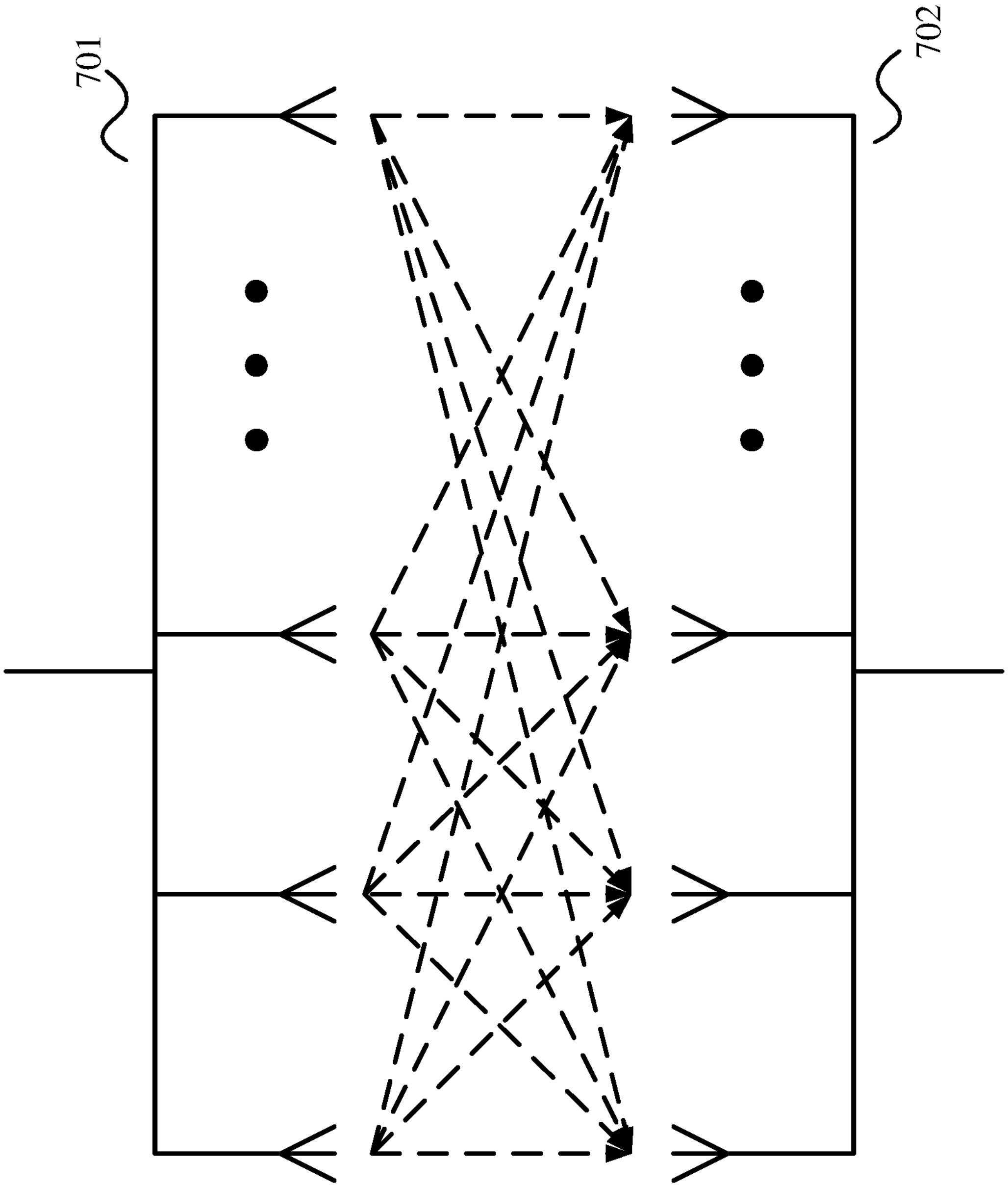
FIG. 7 is a schematic illustration of a Multiple-Input-Multiple-Output (MIMO) radar antenna scheme, which may be implemented based on a combination of Transmit (Tx) and Receive (Rx) antennas, in accordance with some demonstrative aspects.

Reference is made to FIG. 7, which schematically illustrates a MIMO radar antenna scheme, which may be implemented based on a combination of Transmit (Tx) and Receive (Rx) antennas, in accordance with some demonstrative aspects.

In some demonstrative aspects, as shown in FIG. 7, a radar MIMO arrangement may include a transmit antenna array 701 and a receive antenna array 702. For example, the one or more transmit antennas 302 (FIG. 3) may be implemented to include transmit antenna array 701, and/or the one or more receive antennas 303 (FIG. 3) may be implemented to include receive antenna array 702.

In some demonstrative aspects, antenna arrays including multiple antennas both for transmitting the radio transmit signals and for receiving echoes of the radio transmit signals, may be utilized to provide a plurality of virtual channels as illustrated by the dashed lines in FIG. 7. For example, a virtual channel may be formed as a convolution, for example, as a Kronecker product, between a transmit antenna and a receive antenna, e.g., representing a virtual steering vector of the MIMO radar.

In some demonstrative aspects, a transmit antenna, e.g., each transmit antenna, may be configured to send out an individual radio transmit signal, e.g., having a phase associated with the respective transmit antenna.

For example, an array of N transmit antennas and M receive antennas may be implemented to provide a virtual MIMO array of size N×M. For example, the virtual MIMO array may be formed according to the Kronecker product operation applied to the Tx and Rx steering vectors.

Figure 8:
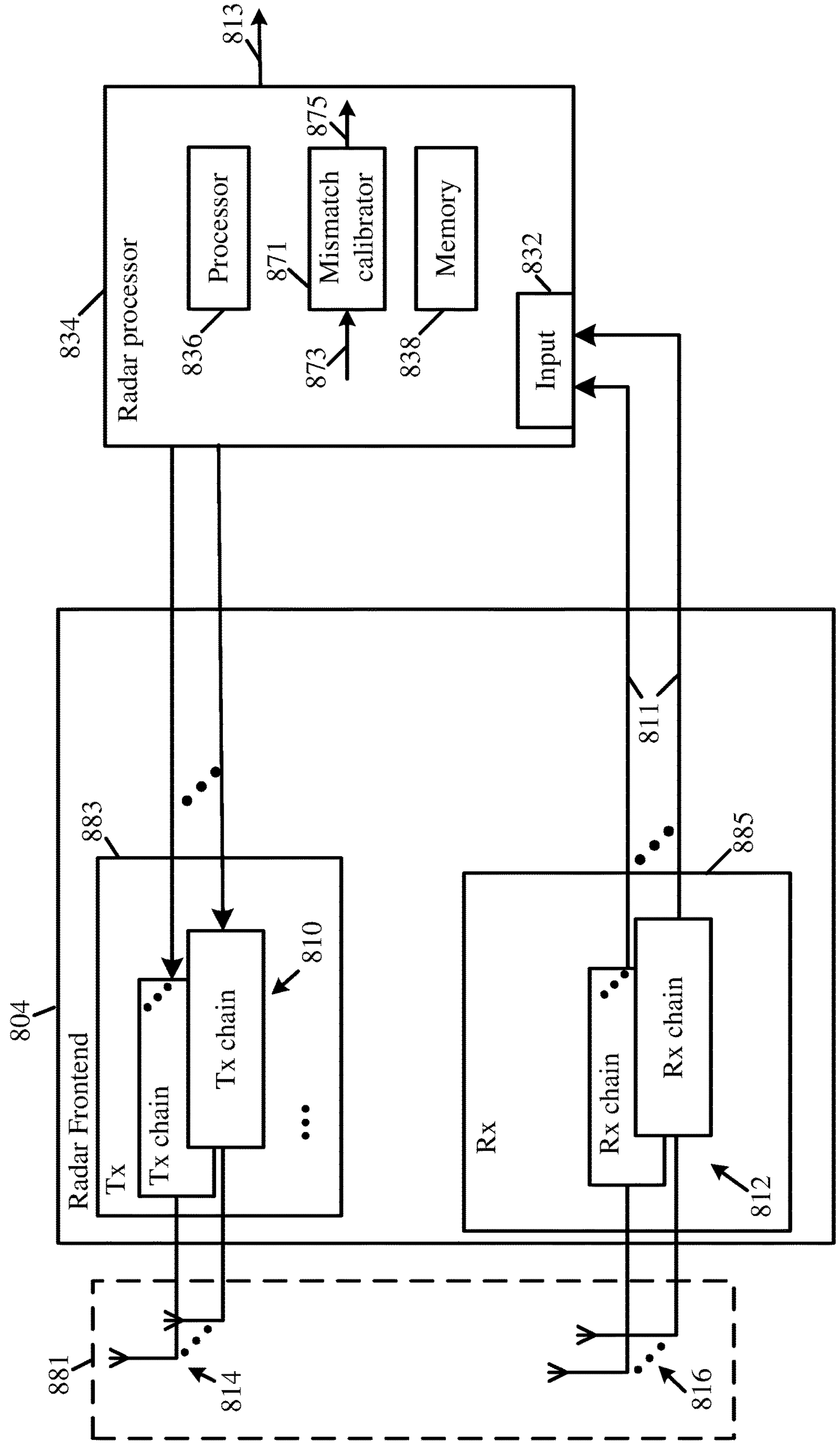
FIG. 8 is a schematic block diagram illustration of a radar frontend and a radar processor, in accordance with some demonstrative aspects.

FIG. 8 is a schematic block diagram illustration of a radar frontend 804 and a radar processor 834, in accordance with some demonstrative aspects. For example, radar frontend 103 (FIG. 1), radar frontend 211 (FIG. 1), radar frontend 304 (FIG. 3), radar frontend 401 (FIG. 4), and/or radar frontend 502 (FIG. 5), may include one or more elements of radar frontend 804, and/or may perform one or more operations and/or functionalities of radar frontend 804.

In some demonstrative aspects, radar frontend 804 may be implemented as part of a MIMO radar utilizing a MIMO radar antenna 881 including a plurality of Tx antennas 814 configured to transmit a plurality of Tx RF signals (also referred to as "Tx radar signals"); and a plurality of Rx antennas 816 configured to receive a plurality of Rx RF signals (also referred to as "Rx radar signals"), for example, based on the Tx radar signals, e.g., as described below.

In some demonstrative aspects, MIMO antenna array 881, antennas 814, and/or antennas 816 may include or may be part of any type of antennas suitable for transmitting and/or receiving radar signals. For example, MIMO antenna array 881, antennas 814, and/or antennas 816, may be implemented as part of any suitable configuration, structure, and/or arrangement of one or more antenna elements, components, units, assemblies, and/or arrays. For example, MIMO antenna array 881, antennas 814, and/or antennas 816, may be implemented as part of a phased array antenna, a multiple element antenna, a set of switched beam antennas, and/or the like. In some aspects, MIMO antenna array 881, antennas 814, and/or antennas 816, may be implemented to support transmit and receive functionalities using separate transmit and receive antenna elements. In some aspects, MIMO antenna array 881, antennas 814, and/or antennas 816, may be implemented to support transmit and receive functionalities using common and/or integrated transmit/receive elements.

In some demonstrative aspects, MIMO radar antenna 881 may include a rectangular MIMO antenna array, and/or curved array, e.g., shaped to fit a vehicle design. In other aspects, any other form, shape and/or arrangement of MIMO radar antenna 881 may be implemented.

In some demonstrative aspects, radar frontend 804 may include one or more radios configured to generate and transmit the Tx RF signals via Tx antennas 814; and/or to process the Rx RF signals received via Rx antennas 816, e.g., as described below.

In some demonstrative aspects, radar frontend 804 may include at least one transmitter (Tx) 883 including circuitry and/or logic configured to generate and/or transmit the Tx radar signals via Tx antennas 814.

In some demonstrative aspects, radar frontend 804 may include at least one receiver (Rx) 885 including circuitry and/or logic to receive and/or process the Rx radar signals received via Rx antennas 816, for example, based on the Tx radar signals.

In some demonstrative aspects, transmitter 883, and/or receiver 885 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like.

In some demonstrative aspects, transmitter 883 may include a plurality of Tx chains 810 configured to generate and transmit the Tx RF signals via Tx antennas 814, e.g., respectively; and/or receiver 885 may include a plurality of Rx chains 812 configured to receive and process the Rx RF signals received via the Rx antennas 816, e.g., respectively.

In some demonstrative aspects, radar processor 834 may be configured to generate radar information 813, for example, based on the radar signals communicated by MIMO radar antenna 881, e.g., as described below. For example, radar processor 104 (FIG. 1), radar processor 210 (FIG. 2), radar processor 309 (FIG. 3), radar processor 402 (FIG. 4), and/or radar processor 503 (FIG. 5), may include one or more elements of radar processor 834, and/or may perform one or more operations and/or functionalities of radar processor 834.

In some demonstrative aspects, radar processor 834 may be configured to generate radar information 813, for example, based on radar Rx data 811 received from the plurality of Rx chains 812. For example, radar Rx data 811 may be based on the radar Rx signals received via the Rx antennas 816.

In some demonstrative aspects, radar processor 834 may include an input 832 to receive radar input data, e.g., including the radar Rx data 811 from the plurality of Rx chains 812.

In some demonstrative aspects, radar processor 834 may include, or may be implemented, partially or entirely, by circuitry and/or logic, e.g., one or more processors including circuitry and/or logic, memory circuitry and/or logic. Additionally or alternatively, one or more functionalities of radar processor 834 may be implemented by logic, which may be executed by a machine and/or one or more processors, e.g., as described below.

In some demonstrative aspects, radar processor 834 may include at least one processor 836, which may be configured, for example, to process the radar Rx data 811, and/or to perform one or more operations, methods, and/or algorithms.

In some demonstrative aspects, radar processor 834 may include at least one memory 838, e.g., coupled to the processor 836. For example, memory 838 may be configured to store data processed by radar processor 834. For example, memory 838 may store, e.g., at least temporarily, at least some of the information processed by the processor 836, and/or logic to be utilized by the processor 836.

In some demonstrative aspects, memory 838 may be configured to store at least part of the radar data, e.g., some of the radar Rx data or all of the radar Rx data, for example, for processing by processor 836, e.g., as described below.

In some demonstrative aspects, memory 838 may be configured to store processed data, which may be generated by processor 836, for example, during the process of generating the radar information 813, e.g., as described below.

In some demonstrative aspects, memory 838 may be configured to store range information and/or Doppler information, which may be generated by processor 836, for example, based on the radar Rx data, e.g., as described below. In one example, the range information and/or Doppler information may be determined based on a Cross-Correlation (XCORR) operation, which may be applied to the radar RX data. Any other additional or alternative operation, algorithm and/or procedure may be utilized to generate the range information and/or Doppler information.

In some demonstrative aspects, memory 838 may be configured to store AoA information, which maybe generated by processor 836, for example, based on the radar Rx data, the range information and/or Doppler information, e.g., as described below. In one example, the AoA information may be determined based on an AoA estimation algorithm. Any other additional or alternative operation, algorithm and/or procedure may be utilized to generate the AoA information.

In some demonstrative aspects, radar processor 834 may be configured to generate the radar information 813 including one or more of range information, Doppler information, and/or AoA information, e.g., as described below.

In some demonstrative aspects, the radar information 813 may include Point Cloud 1 (PC1) information, for example, including raw point cloud estimations, e.g., Range, Radial Velocity, Azimuth and/or Elevation.

In some demonstrative aspects, the radar information 813 may include Point Cloud 2 (PC2) information, which may be generated, for example, based on the PC1 information. For example, the PC2 information may include clustering information, tracking information, e.g., tracking of probabilities and/or density functions, bounding box information, classification information, orientation information, and the like.

In some demonstrative aspects, radar processor 834 may be configured to generate the radar information 813 in the form of four Dimensional (4D) image information, e.g., a cube, which may represent 4D information corresponding to one or more detected targets.

In some demonstrative aspects, the 4D image information may include, for example, range values, e.g., based on the range information, velocity values, e.g., based on the Doppler information, azimuth values, e.g., based on azimuth AoA information, elevation values, e.g., based on elevation AoA information, and/or any other values.

In some demonstrative aspects, radar processor 834 may be configured to generate the radar information 813 in any other form, and/or including any other additional or alternative information.

In some demonstrative aspects, radar processor 834 may be configured to process the signals communicated via MIMO radar antenna 881 as signals of a virtual MIMO array formed by a convolution of the plurality of Rx antennas 816 and the plurality of Tx antennas 814.

In some demonstrative aspects, radar frontend 804 and/or radar processor 834 may be configured to utilize MIMO techniques, for example, to support a reduced physical array aperture, e.g., an array size, and/or utilizing a reduced number of antenna elements. For example, radar frontend 804 and/or radar processor 834 may be configured to transmit orthogonal signals via a Tx array including a plurality of N elements, e.g., Tx antennas 814, and processing received signals via an Rx array including a plurality of M elements, e.g., Rx antennas 816.

In some demonstrative aspects, utilizing the MIMO technique of transmission of the orthogonal signals from the Tx array with N elements and processing the received signals in the Rx array with M elements may be equivalent, e.g., under a far field approximation, to a radar utilizing transmission from one antenna and reception with N*M antennas. For example, radar frontend 804 and/or radar processor 834 may be configured to utilize MIMO antenna array 881 as a virtual array having an equivalent array size of N*M, which may define locations of virtual elements, for example, as a convolution of locations of physical elements, e.g., the antennas 814 and/or 816.

In some demonstrative aspects, there may be a need to provide a technical solution to efficiently and/or accurately calibrate an antenna array, e.g., MIMO antenna array 881. For example, antennas may be manufactured with some enhanced phase and gain as their ground state, and, accordingly, an antenna array may be dysfunctional, for example, if the antenna elements of the array are not calibrated.

In some demonstrative aspects, there may be a need to provide a technical solution to efficiently and/or accurately calibrate an antenna array mismatch (MM) of an antenna array, for example, by calibrating at least one of a Gain MM (GMM), a Phase MM (PMM), a Cross Coupling (CC), and/or any other type of MM between elements of the antenna array.

Some demonstrative aspects may be configured to provide a technical solution to support calibrating an antenna array at multiple instances, for example, at one or more defined instances, in a dynamic manner, and/or in real-time, for example, post installation and/or during operation of radar frontend 804. In one example, radar processor 834 may be configured to support calibration of MIMO antenna array 881, for example, upon or after installation of one or more antenna elements of MIMO antenna array 881, and/or at one or more later times, for example, after treatment of one or more antenna elements in antenna array 881 and/or after treatment to surroundings of the MIMO antenna array 881.

In some demonstrative aspects, radar processor 834 may be configured to perform a mismatch calibration to calibrate a mismatch of MIMO antenna array 881, for example, to improve performance of the antenna array 881, e.g., as described below.

In some demonstrative aspects, there may be a need to provide a technical solution to achieve a sufficient Peak Side Lobe Level (PSLL) of an estimated Angle of Arrival (AoA) spectrum, which may be a Key Performance Indicator (KPI) for many radar systems.

In some demonstrative aspects, the PSLL of an AoA spectrum may be determined as a difference between a power level (e.g., in dB) of a main-lobe in the AoA spectrum, and a power level (e.g., in dB) of a peak, e.g., a maximal, side-lobe corresponding to the main-lobe. For example, according to this PSLL determination, a higher PSLL may be considered better than a lower PSLL.

In some demonstrative aspects, for example, when the main-lobe has a power level of 0 dB, then the PSLL may be determined as a positive value according to the power level of the peak side-lobe corresponding to the main-lobe.

In other aspects, the PSLL of an AoA spectrum may be determined as a difference between a power level (e.g., in dB) of a peak, e.g., maximal, side-lobe corresponding to a main-lobe, and a power level (e.g., in dB) of the main-lobe in the AoA spectrum. For example, according to this PSLL definition, the PSLL may include a negative value. For example, according to this PSLL definition, a lower PSLL may be considered better than a higher PSLL.

In some demonstrative aspects, the PSLL may be affected by the antenna array mismatch. For example, in order to achieve a sufficient, e.g., improved, PSLL level, there may be a need to reduce an antenna mismatch.

In some demonstrative aspects, implementing an antenna array without antenna MM calibration, may result in PSLL levels which may result in one or more technical inefficiencies, disadvantages and/or problems in one or more use cases and/or scenarios, e.g., as described below.

In some demonstrative aspects, a target detection process may become challenging, for example, in scenarios where multiple targets with high dynamic range, e.g., large difference in reflectivity, are to be discriminated. In one example, there may be a need to be able to discriminate between a truck and a motorcycle, which may have as much as 40 dB difference in reflectivity, e.g., as described below.

Figure 9:
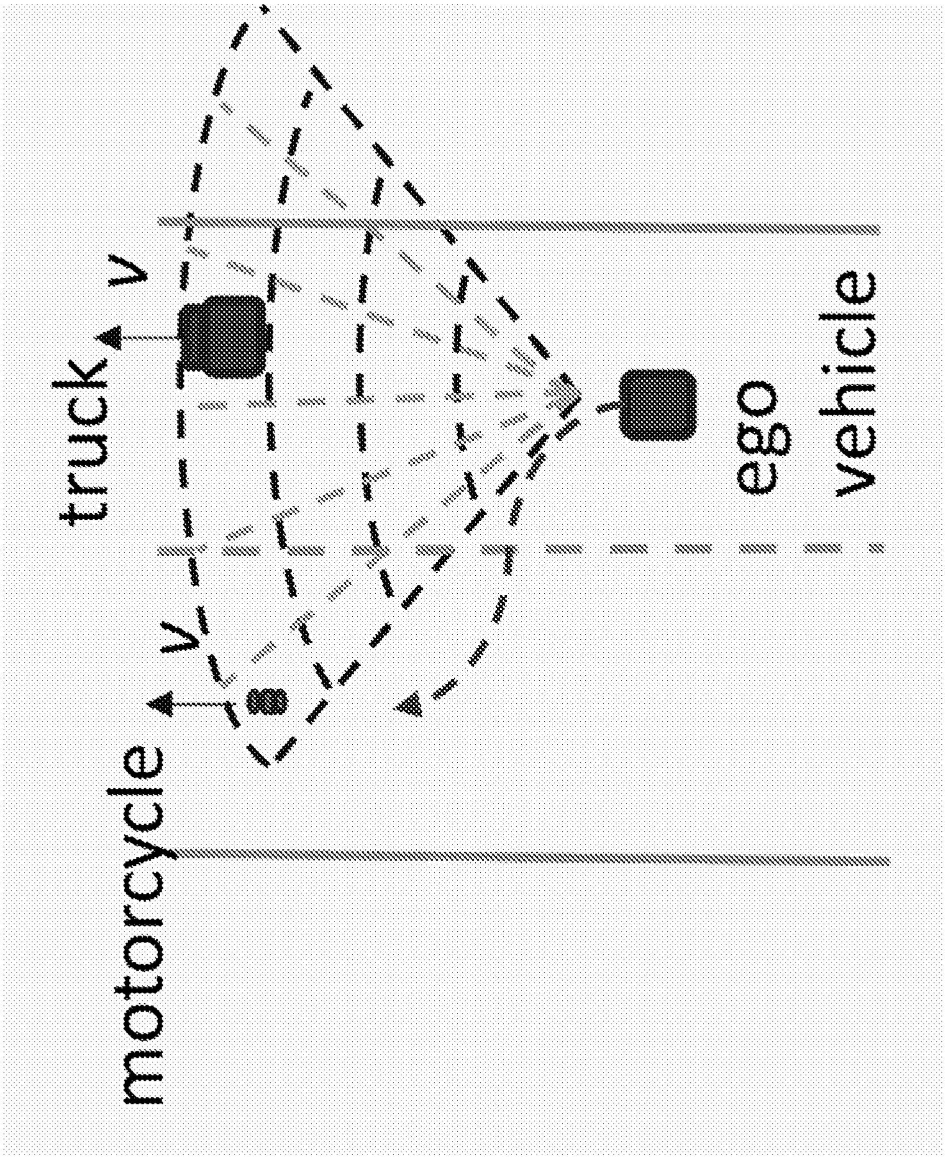
FIG. 9 is a schematic illustration of a radar detection scenario to demonstrate a technical problem, which may be addressed in accordance with some demonstrative aspects.

Reference is made to FIG. 9, which schematically illustrates a radar detection scenario to demonstrate a technical problem, which may be addressed in accordance with some demonstrative aspects.

Figure 10:
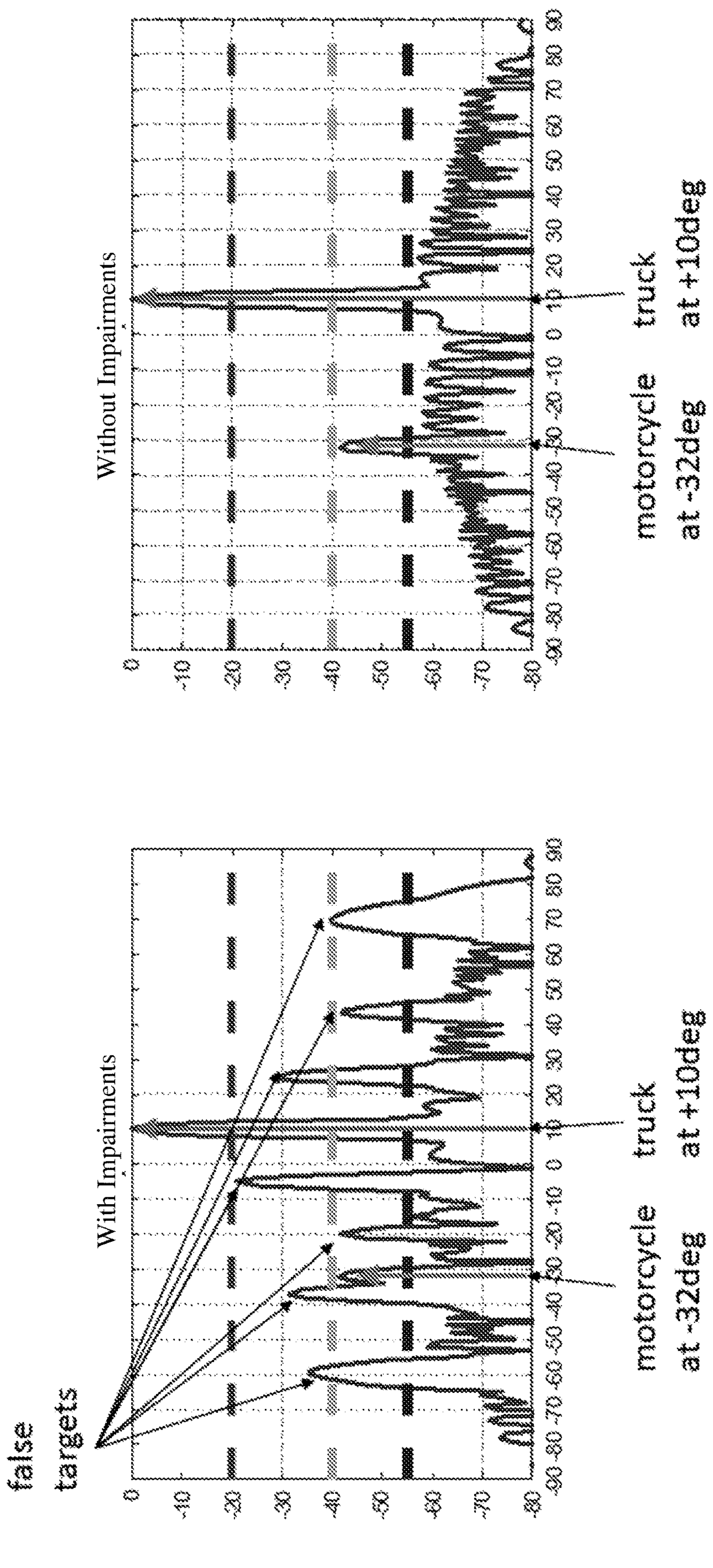
FIG. 10 is a schematic illustration of graphs depicting an effect of antenna mismatch on an AoA spectrum corresponding to the radar detection scenario of FIG. 9, to demonstrate a technical problem, which may be addressed in accordance with some demonstrative aspects.

Reference is also made to FIG. 10, which schematically illustrates graphs depicting an effect of antenna mismatch on an AoA spectrum corresponding to the radar detection scenario of FIG. 9, to demonstrate a technical problem, which may be addressed in accordance with some demonstrative aspects.

As shown in FIG. 9, there may be two high dynamic range targets traveling at substantially the same range and velocity but with different azimuth angles.

For example, as shown in FIG. 9, a truck, e.g., at 10 deg azimuth, and a motorcycle, e.g., at −32 deg azimuth, may be driving at substantially the same range and velocity on a highway, e.g., in two separate lanes. For example, a radar processor on a vehicle may interrogate the scene to attempt a left takeover. For example, because both targets are traveling at the same range and velocity, the radar processor of the vehicle may be unable to discriminate between these two targets based on their range and velocity. However, a measure of the azimuth spectrum in theory would reveal these two targets. Such a measure of the azimuth spectrum may allow to discriminate between the two targets, for example, in case the azimuth sidelobes are highly suppressed, e.g., up to 55 dB below the main lobe. In practice, in many use cases antenna mismatches may limit the sidelobe suppression to about 20 dB below the main lobe.

As shown in FIG. 10, antenna mismatches may impact azimuth sidelobes and/or a number of “false alarms”, e.g., instances of a false detection of a target.

As shown in FIG. 10, at a detection threshold of −40 dB, the motorcycle appears below the detection threshold, and there are four false alarms, e.g., due to azimuth sidelobes.

As also shown in FIG. 10, at a −55 dB detection threshold, the motorcycle peak merges with a sidelobe at −40 deg, and there are seven false alarms.

As further shown in the right-hand graph of FIG. 10, in absence of impairments, e.g., if the antenna mismatch is calibrated, there are only two spectral peaks, one at +10 deg (truck) and one at −32 deg (motorcycle), and they may be fully resolved, for example, while setting the detector threshold to −55 dB.

In some demonstrative aspects, a technique based on an Inverse Coupling Matrix (ICM) may be implemented, for example, to mitigate and/or compensate for MIMO radar antenna mismatch, e.g., as described below.

For example, the ICM may be implemented as an effective method to compensate for antenna mutual coupling in digital beamforming arrays. This method may be amenable to the problem of MIMO radar antenna array calibration, for example, since a MIMO radar may form its beams digitally in the receivers.

For example, an ICM that negates the mutual coupling effects in a small array may be estimated and the ICM may be applied to restore one or more antenna elements, e.g., each embedded antenna element, to behave like an isolated antenna element.

In some demonstrative aspects, there may be a need for a technical solution to support implementing the ICM technique for antenna mismatch calibration of a MIMO radar antenna, for example, in an accurate and/or efficient manner, e.g., as described below.

In some demonstrative aspects, in some use cases, scenarios, and/or implementation, there may be a technical problem when applying a same single, e.g., constant, ICM for all antenna elements and/or angles of a MIMO antenna, e.g., as described below.

For example, under a single mode antenna assumption, the ICM may be scan independent. However, in practice, the single mode antenna condition may not generally be met and may depend, for example, on the relative magnitude of higher order modes.

In one example, in some implementations, for example, in printed patch antenna arrays, a TM0 surface wave mode may be excited in the substrate, for example, in addition to a fundamental TM010 antenna mode. In such case, currents on the patch antenna may feed, e.g., usually a probe, and may also radiate. Effectively, several current sources other than the fundamental antenna mode may contribute to the total radiated fields. The surface wave radiation may be more intense, for example, due to discontinuities on the substrate and/or edge effects, which may exacerbate the surface wave radiation. These phenomena may result in lack of separability in the two-dimensional antenna patterns of the array elements.

Figure 11:
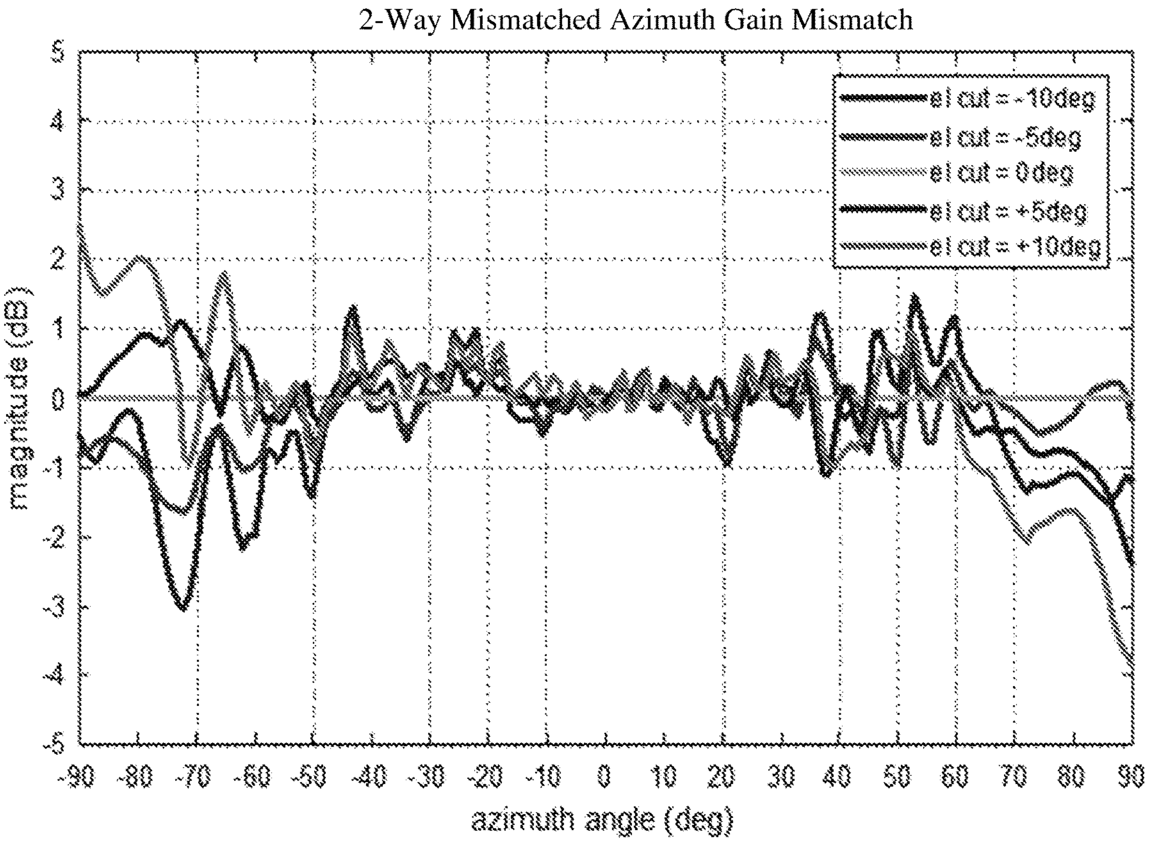
FIG. 11 is a schematic illustration of graphs depicting antenna mismatches corresponding to a plurality of elevation angles, to demonstrate a technical problem, which may be addressed in accordance with some demonstrative aspects.
Figure 11:
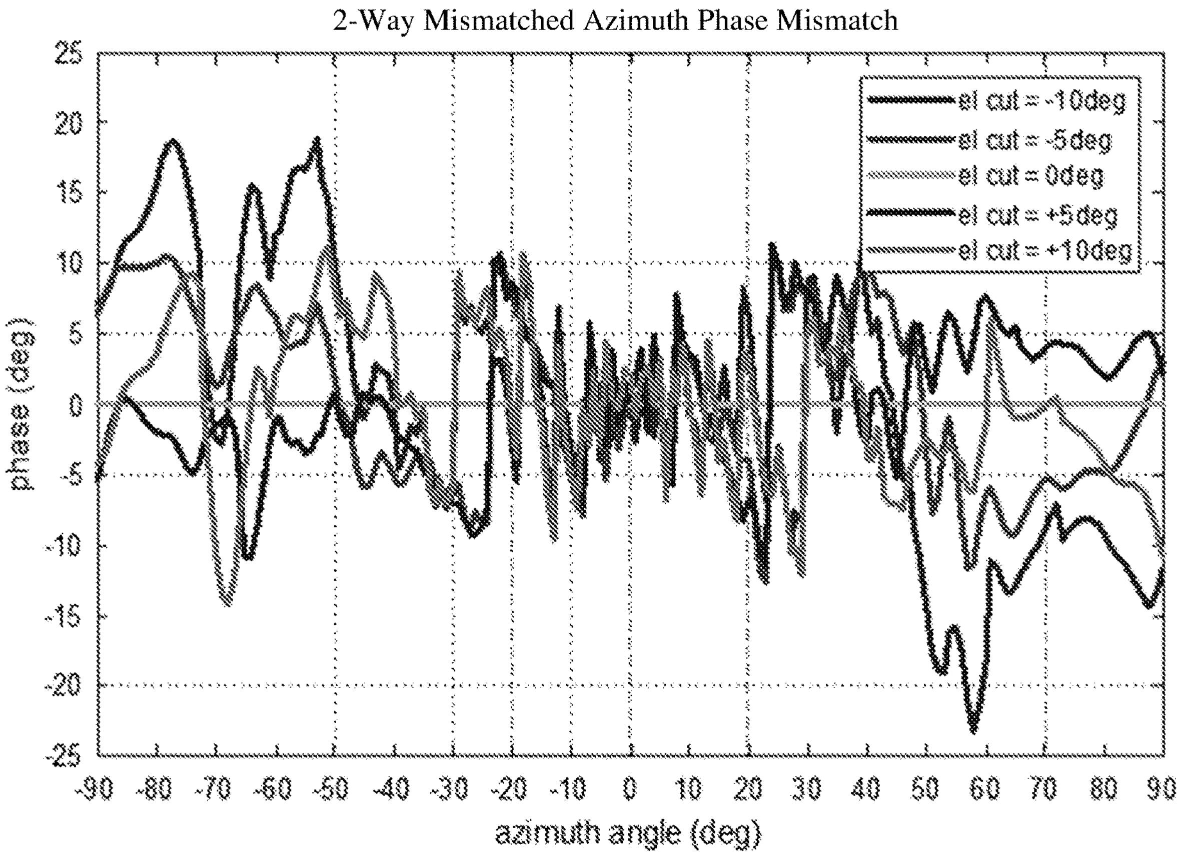

Reference is made to FIG. 11, which schematically illustrates graphs depicting antenna mismatches corresponding to a plurality of elevation angles, to demonstrate a technical problem, which may be addressed in accordance with some demonstrative aspects.

As shown in FIG. 11, the azimuth gain mismatches (top graph) and phase mismatches (bottom graph) between two randomly picked antenna elements in a MIMO array may vary, for example, at different elevation cuts, relative to a central elevation cut.

As shown in FIG. 11, the gain mismatch may generally fluctuate slightly, e.g., between +/−2 dB, for example, based on the changes in the elevation angles.

As shown in FIG. 11, in opposed to the generally slight fluctuations of the gain mismatch, the phase mismatch may fluctuate in a relatively wide range, e.g., between +/−15 deg, for example, in a field of view of interest.

In some demonstrative aspects, the elevation angle dependent azimuth mismatch, e.g., as shown in FIG. 11, may be the cause of, and may be referred to as, lack of separability in the two-dimensional patterns.

In some demonstrative aspects, under the conditions illustrated in FIG. 11, there may be no such single inverse coupling matrix that may fully compensate for the lack of separability in the two-dimensional antenna patterns of most of, or all of, the array elements.

In some demonstrative aspects, applying a single inverse coupling matrix will allow to partially compensate for the lack of separability in the two-dimensional antenna patterns of the array elements.

Figure 12:
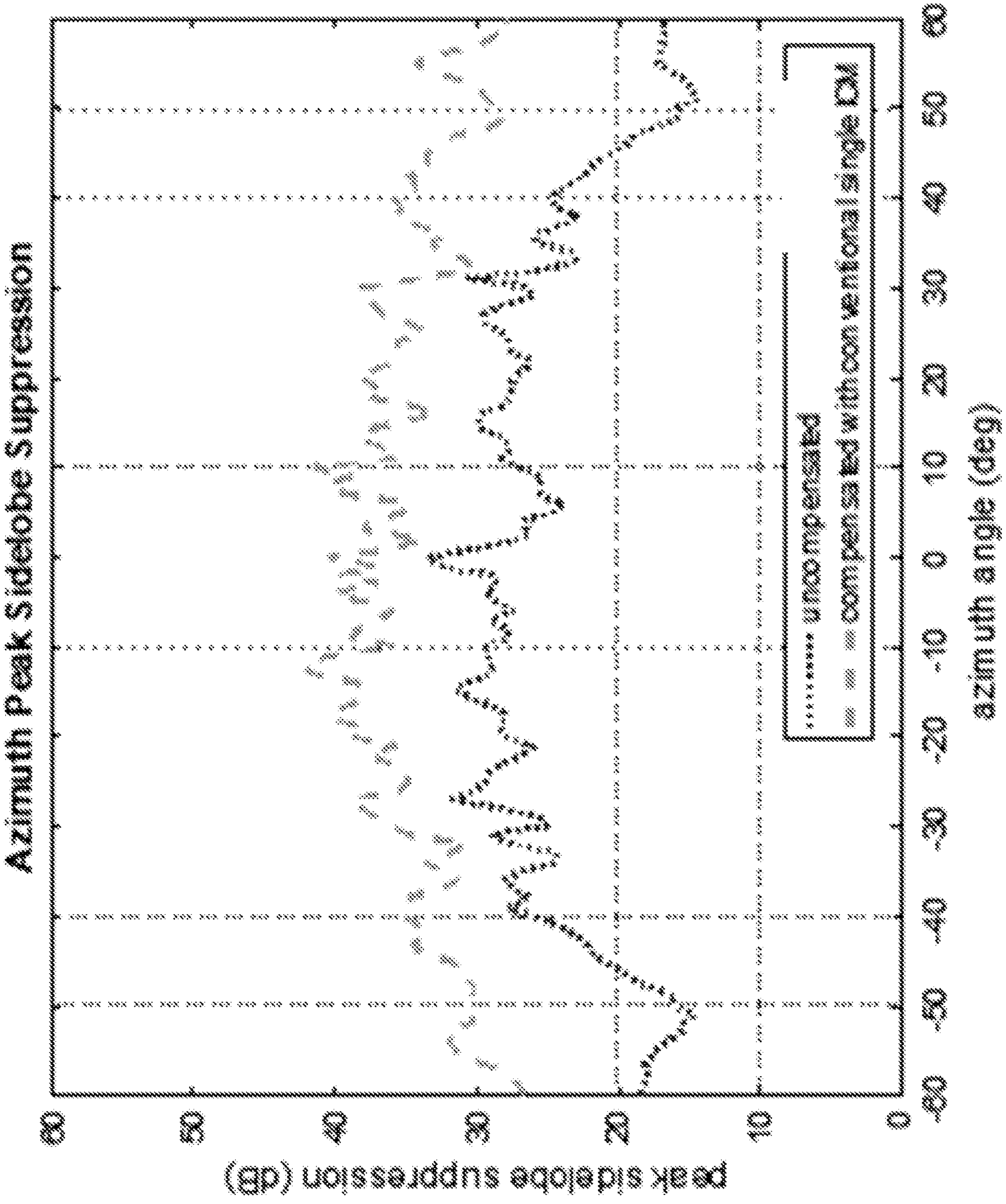
FIG. 12 is a schematic illustration of a graph depicting an azimuth peak sidelobe suppression, to demonstrate a technical problem, which may be addressed in accordance with some demonstrative aspects.

Reference is made to FIG. 12, which schematically illustrates a graph depicting an azimuth peak sidelobe suppression, to demonstrate a technical problem, which may be addressed in accordance with some demonstrative aspects.

For example, the graph of FIG. 12 may be generated based on antenna pattern information relating to an elevation of a zero degrees cut.

As shown in FIG. 12, applying one single ICM, which is estimated in a range of angles between +/−90 deg azimuth and +/−20 deg elevation, may provide some improvement in the peak sidelobe suppression, e.g., compared to no compensation. However, this improvement may not be enough, as antenna mismatches may only be partially suppressed. For example, as shown in FIG. 12, the suppression may be much less effective at large azimuth angles.

Referring back to FIG. 8, in some demonstrative aspects, radar processor 834 may be configured to generate radar information 813, for example, based on radar Rx data 811 and a mismatch calibration, e.g., as described below.

In some demonstrative aspects, radar processor 834 may be configured to generate radar information 813, for example, by applying one or more techniques, which may be configured to address one or more technical problems, for example, to overcome the sidelobes suppression limitation, and/or to meet a requirement for high target dynamic range, e.g., as described below.

In some demonstrative aspects, radar processor 834 may be configured to generate radar information 813 according to a Pattern Reconstruction method, which may be configured to compensate for antenna mismatches, for example, in a 2D angular spectrum, e.g., in an azimuth—elevation domain, e.g., as described below.

In some demonstrative aspects, the Pattern Reconstruction method may be configured to address the technical issue of the lack of separability in the two-dimensional antenna patterns of the array elements, e.g., as described below.

In one example, radar processor 834 may be configured to generate radar information 813 according to the Pattern Reconstruction method, for example, to yield an improved azimuth peak sidelobe suppression, e.g., better than 50 dB, for example, at moderate scan angles, and/or better than 40 dB, e.g., over the entire field of view. These results may represent an improvement of nearly 30 dB over the uncompensated case, and nearly 20 dB over the single ICM method discussed above.

In other aspects, radar processor 834 may be configured to generate radar information 813 according to the Pattern Reconstruction method, for example, to yield other levels, e.g., even better levels, of improvement for some or all of the scan angles.

In some demonstrative aspects, in one implementation, radar processor 834 may be implemented as part of a vehicle, e.g., vehicle 100 (FIG. 1), e.g., an autonomous vehicle, which may utilize a scheme of fully redundant sensors. For example, radar processor 834 may be implemented as part of a 4D radar sensor, which may be configured to provide advanced, e.g., even extraordinary, discrimination capabilities in one or more, e.g., even in all four, dimensions. For example, the ability to achieve a high level of sidelobe suppression may be utilized to prevent false alarms that otherwise may impair the accuracy of the radar sensor. The improved target discrimination capabilities may be utilized, for example, for imaging a scene with high contrast and/or high resolution, for example, at a level comparable to Lidar, e.g., at a much lower price.

Some demonstrative aspects are described herein with respect to calibrating antenna mismatch for a radar antenna of a vehicle. Other aspects may be implemented to calibrate antenna mismatch with respect to any other beamforming array, for example, in wireless communication systems, and/or for any other system and/or use.

In some demonstrative aspects, radar processor 834 may be configured to generate radar information 833 including AoA information, for example, azimuth AoA information, elevation AoA information, and/or any other AoA-based information.

In some demonstrative aspects, radar processor 834 may be configured to generate radar information 833 including an AoA spectrum, e.g., an azimuth AoA spectrum an elevation AoA spectrum, and/or any other AoA-based spectrum.

In some demonstrative aspects, radar processor 834 may be configured to perform a mismatch calibration to calibrate a mismatch of MIMO antenna array 881, for example, to improve performance of the antenna array 881, for example, to achieve a PSLL of at least 30 dB, e.g., as described below.

In some demonstrative aspects, radar processor 834 may be configured to perform the mismatch calibration of MIMO antenna array 881, for example, according to a calibration technique, which may be performed within a relatively short time period, e.g., even within a few minutes.

In some demonstrative aspects, radar processor 834 may be configured to perform the mismatch calibration of MIMO antenna array 881, for example, according to a calibration technique, which may be performed in real-time, and/or according to a suitable timing scheme, for example, to dynamically calibrate the mismatch calibration of MIMO antenna array 881.

In some demonstrative aspects, radar processor 834 may be configured to generate radar information 813 based on the radar Rx data 811, for example, by calibrating an antenna Mismatch (MM) of the MIMO radar antenna 881, for example, such that the radar information 813 includes an AoA spectrum having a PSLL of at least 30 dB, e.g., as described below.

For example, the PSLL may be defined and/or determined based on a difference between a power level of a main-lobe of the AoA spectrum and a power level of a peak side-lobe corresponding to the main-lobe in the AoA spectrum, e.g., as described below.

In some demonstrative aspects, radar processor 834 may be configured to generate radar information 813 including the AoA spectrum having a PSLL of at least 35 dB, for example, wherein the PSLL is determined as a difference between a power level of a main-lobe of the AoA spectrum and a power level of a peak side-lobe corresponding to the main-lobe in the AoA spectrum, e.g., as described below.

In some demonstrative aspects, radar processor 834 may be configured to generate radar information 813 including the AoA spectrum having a PSLL of at least 40 dB, for example, wherein the PSLL is determined as a difference between a power level of a main-lobe of the AoA spectrum and a power level of a peak side-lobe corresponding to the main-lobe in the AoA spectrum, e.g., as described below.

In some demonstrative aspects, radar processor 834 may be configured to generate radar information 813 including the AoA spectrum having a PSLL of at least 45 dB, for example, wherein the PSLL is determined as a difference between a power level of a main-lobe of the AoA spectrum and a power level of a peak side-lobe corresponding to the main-lobe in the AoA spectrum, e.g., as described below.

In some demonstrative aspects, radar processor 834 may be configured to generate radar information 813 including the AoA spectrum having a PSLL of at least 50 dB, for example, wherein the PSLL is determined as a difference between a power level of a main-lobe of the AoA spectrum and a power level of a peak side-lobe corresponding to the main-lobe in the AoA spectrum, e.g., as described below.

In some demonstrative aspects, radar processor 834 may be configured to generate radar information 813 including the AoA spectrum having a PSLL of at least 55 dB, for example, wherein the PSLL is determined as a difference between a power level of a main-lobe of the AoA spectrum and a power level of a peak side-lobe corresponding to the main-lobe in the AoA spectrum, e.g., as described below.

In some demonstrative aspects, radar processor 834 may be configured to generate radar information 113 including the AoA spectrum having a PSLL of at least 60 dB, for example, wherein the PSLL is determined as a difference between a power level of a main-lobe of the AoA spectrum and a power level of a peak side-lobe corresponding to the main-lobe in the AoA spectrum, e.g., as described below.

In some demonstrative aspects, radar processor 834 may be configured to generate radar information 813 including the AoA spectrum having any other suitable PSLL level.

In some demonstrative aspects, radar processor 834 may be configured to calibrate the antenna MM of MIMO antenna 881 according to a Pattern Reconstruction method utilizing a plurality of ICMs, e.g., as described below.

In some demonstrative aspects, the plurality of ICMs may be determined, calibrated and/or estimated, for example, during a calibration stage, for example, during manufacturing of radar frontend 804, at installation of radar frontend 804, e.g., on vehicle 100 (FIG. 1), as a maintenance procedure, and/or at any other suitable timing or as part of any other procedure.

In some demonstrative aspects, some or all of the plurality of ICMs may be predetermined, e.g., during the calibration stage, and stored, e.g., in memory 838, for use by radar processor, e.g., as described below.

In some demonstrative aspects, some or all of the ICMs may be determined and/or estimated dynamically, for example, in real-time or on the fly, e.g., during operation of radar frontend 804. In one example, radar processor 834 may be configured to re-estimate one or more of the ICMs, e.g., during operation, and to update the memory 838 with the re-estimated ICMs.

In some demonstrative aspects, the antenna MM calibration of MIMO array 881 may be based on an array and pattern decomposition of the MIMO array 881 into a plurality of one-dimensional sub-arrays, e.g., as described below.

In some demonstrative aspects, the one-dimensional sub-arrays may include rows of antenna elements, e.g., as described below.

In other aspects, the one-dimensional sub-arrays may include columns of antenna elements, e.g., as described below.

In other aspects, the one-dimensional sub-arrays may include any other sub-arrays in any other dimension.

In some demonstrative aspects, a planar array having a rectangular lattice, e.g., MIMO array 881, may be decomposed into a plurality of distinct rows, e.g., $N_{row}$ distinct rows.

In some demonstrative aspects, for a row of the plurality of rows, e.g., for each row of the planar array lattice, two-dimensional antenna element patterns of the signals communicated by the MIMO array 881 may be decomposed at a plurality of elevation angles, e.g., at $N_{el}$ elevation angles.

In some demonstrative aspects, a plurality of ICMs may be estimated with respect to the plurality of rows and the plurality of elevation angles, e.g., as described below.

In some demonstrative aspects, an ICM may be estimated for an elevation angle, e.g., for each elevation angle, for example, by estimating a matrix that compensates, e.g., fully compensates, for azimuth mismatches, at that specific elevation angle, and for that specific row of antenna elements.

In some demonstrative aspects, the plurality of ICMs may include, for example, $N_{row}\times N_{el}$ matrices, for example, corresponding to $N_{row}\times N_{el}$ different combinations of the $N_{row}$ rows and the $N_{el}$ elevation angles, e.g., as described below.

In some demonstrative aspects, some or all of the plurality of ICMs may be stored in memory 838, and processor 836 may be configured to retrieve some or all of the ICMs from the memory 838 to calibrate the antenna MM of MIMO antenna 881, e.g., as described below.

In some demonstrative aspects, radar processor 834 may be configured to process the Rx signals of the MIMO array 881 by calibrating the antenna MM of MIMO array 181 according to the plurality of ICMs, e.g., as described below.

In some demonstrative aspects, radar processor 834 may be configured to reconstruct a compensated pattern of the signals communicated by the MIMO array 881 based on the plurality of ICMs, e.g., as described below.

In some demonstrative aspects, for a row and an elevation angle, e.g., for each row and elevation angle, a one-dimensional ICM correction may be applied to received echo signals, e.g., the Rx signals, and a one-dimensional azimuth beamforming with windowing may be performed, e.g., as described below.

In some demonstrative aspects, radar processor 834 may be configured to perform a one-dimensional elevation beamforming with windowing, e.g., across the sets of azimuth responses, for example, to yield a fully compensated two-dimensional beam pattern, e.g., as described below.

In some demonstrative aspects, radar processor 834 may receive, e.g., via input 832, input radar data, e.g., including the Rx input data 811 representing the radar Rx signals of MIMO radar antenna 881, e.g., as described above.

In some demonstrative aspects, processor 836 may be configured to generate radar information 813 based on the input radar data, for example, by calibrating an antenna MM of the MIMO radar antenna 881 in a first dimension of an Azimuth-Elevation domain according to a plurality of one-dimensional (1D) ICMs, e.g., as described below.

In some demonstrative aspects, the plurality of 1D ICMs may correspond to a plurality of antenna sub-arrays of the MIMO radar antenna 881 and to a plurality of angles in a second dimension of the Azimuth-Elevation domain, e.g., as described below.

In some demonstrative aspects, a 1D ICM of the plurality of 1D ICMs may correspond to a combination of an antenna sub-array of the plurality of antenna sub-arrays, and an angle of the plurality of angles in the second dimension of the Azimuth-Elevation domain, e.g., as described below.

In some demonstrative aspects, the first dimension of the Azimuth-Elevation domain may include an azimuth dimension, the second dimension of the Azimuth-Elevation domain may include an elevation dimension, the plurality of antenna sub-arrays of the MIMO radar antenna may include a plurality of rows of the MIMO radar antenna, and the 1D ICM may correspond to a combination of a row and an elevation angle, e.g., as described below.

In some demonstrative aspects, the first dimension of the Azimuth-Elevation domain may include an elevation dimension, the second dimension of the Azimuth-Elevation domain may include an azimuth dimension, the plurality of antenna sub-arrays of the MIMO radar antenna may include a plurality of columns of the MIMO radar antenna, and the 1D ICM may correspond to a combination of a column and an azimuth angle, e.g., as described below.

In some demonstrative aspects, a 1D ICM of the plurality of 1D ICMs corresponding to an antenna sub-array of the plurality of antenna sub-arrays may include an n×n square matrix of n columns and n rows. For example, the size of n may be based on a count of antenna elements in the antenna sub-array to which the 1D ICM corresponds, e.g., as described below.

In Other aspects, a 1D ICM of the plurality of 1D ICMs corresponding to an antenna sub-array of the plurality of antenna sub-arrays may include any other matrix of any other size and/or any other matrix of any other type, e.g., a non-square matrix.

In some demonstrative aspects, the plurality of 1D ICMs may include a first 1D ICM and a second 1D ICM corresponding to the same antenna sub-array, e.g., as described below. For example, the first 1D ICM may be different from the second 1D ICM.

For example, the first 1D ICM may correspond to a first combination of the antenna sub-array and a first angle of the plurality of angles in the second dimension of the Azimuth-Elevation domain, e.g., as described below.

For example, the second 1D ICM may correspond to a second combination of the antenna sub-array and a second angle of the plurality of angles in the second dimension of the Azimuth-Elevation domain, e.g., as described below.

In some demonstrative aspects, the plurality of 1D ICMs may include a first 1D ICM and a second ICM corresponding to the same angle, e.g., as described below. For example, the first 1D ICM may be different from the second 1D ICM.

For example, the first 1D ICM may correspond to a first combination of a first antenna sub-array and the angle, e.g., as described below.

For example, the second 1D ICM may correspond to a second combination of a second antenna sub-array and the angle, e.g., as described below.

In some demonstrative aspects, the MIMO radar antenna 881 may include a rectangular MIMO antenna array, e.g., as described above.

In some demonstrative aspects, radar processor 834 may be configured to determine the plurality of antenna sub-arrays of the MIMO radar antenna 881 to include a plurality of antenna sub-arrays in a virtual MIMO array formed by a convolution of the plurality of Rx antennas 816 and the plurality of Tx antennas 814.

In other aspects, the MIMO radar antenna 881 may include a MIMO antenna array of any other shape, form and/or arrangement.

Figure 13:
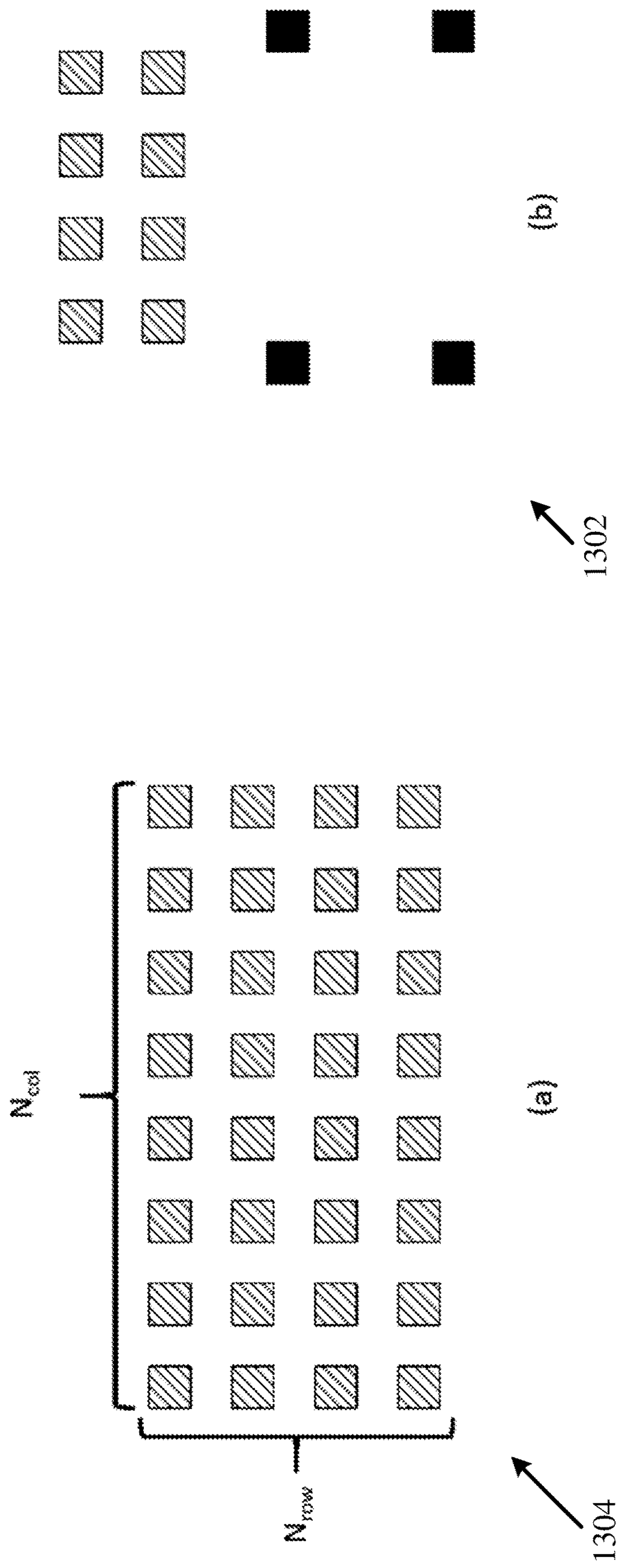
FIG. 13 is a schematic illustration of a MIMO antenna scheme, which may be implemented in accordance with some demonstrative aspects.

Reference is made to FIG. 13, which schematically illustrates a MIMO antenna scheme, which may be implemented in accordance with some demonstrative aspects. In one example, MIMO array 881 (FIG. 8) may be configured according to the MIMO antenna scheme of FIG. 13. In other aspects, any other MIMO antenna scheme, e.g., including any other number, shape and/or arrangement of antenna elements, may be used.

In some demonstrative aspects, as shown in the right hand portion (b) of FIG. 13, a MIMO array 1302 may include a plurality of transmit (Tx) antenna elements, e.g., 8 Tx antenna elements in two rows at the top of the MIMO array, and a plurality of Receive (Rx) antenna elements, e.g., 4 Rx antenna elements at the bottom of the MIMO array.

In some demonstrative aspects, as shown in the left hand portion (a) of FIG. 13, the MIMO array 1302 may yield a virtual MIMO array 1304, e.g., including a Uniform Rectangular Array (URA).

In some demonstrative aspects, as shown in FIG. 13, the virtual MIMO array 1304 may include a plurality of rows, e.g., $N_{row}$ rows, and a plurality of columns, e.g., $N_{col}$ columns, of antenna elements. For example, the virtual MIMO array 1304 may be decomposed into $N_{row}$ Rx antenna sub-arrays corresponding to the $N_{row}$ rows.

Referring back to FIG. 8, in some demonstrative aspects, radar processor 834 may be configured to generate intermediate radar information 873 based on the radar input signals 811, e.g., as described below.

In some demonstrative aspects, for example, the intermediate radar information 873 may include intermediate range-Doppler information based on the Rx input data 811.

In some demonstrative aspects, processor 836 may be configured to generate the intermediate range-Doppler information by processing the Rx input data 811, for example, according to a range-Doppler processing scheme.

For example, processor 836 may be configured to generate intermediate range information by applying range-based processing, e.g., cross correlation processing, to the Rx input data 811.

For example, processor 836 may be configured to generate the intermediate range-Doppler information by applying Doppler-based processing, e.g., Fast Fourier Transform (FFT) processing and/or any other processing, to the intermediate range information.

In other aspects, intermediate radar information 873 may include any other information, for example, partially processed radar information based on Rx input data 811.

In some demonstrative aspects, radar processor 834 may include an antenna MM calibrator 871 configured to generate calibrated intermediate radar information 875 by applying an antenna MM calibration to the intermediate radar data 873, e.g., as described below.

In some demonstrative aspects, antenna mismatch calibrator 871 may be implemented as part of processor 836. In other aspects, antenna mismatch calibrator 871 and processor 836 may be implemented as separate and/or dedicated elements, e.g., processors, of radar processor 834.

In some demonstrative aspects, radar processor 834 may be configured to generate the radar information 813 based on the calibrated intermediate radar information 875, e.g., as described below.

In some demonstrative aspects, radar processor 834 may be configured to generate the radar information 813 by applying to the calibrated intermediate radar information 875 one or more radar-processing operations, for example, AoA-based processing operations, and/or any other additional or alternative radar processing operations.

In some demonstrative aspects, radar processor 834 may be configured to generate the radar information 813 including an AoA spectrum in a first dimension of the Azimuth-Elevation domain. For example, radar processor 834 may be configured to calibrate the antenna MM of the MIMO radar antenna 881 such that the AoA spectrum has a PSLL of at least 30 dB, e.g., as described below.

In some demonstrative aspects, radar processor 834 may be configured to generate the radar information 813 by calibrating the antenna MM of the MIMO radar antenna 881 to provide the radar information 813 including the AoA spectrum having a PSLL of at least 35 dB.

In some demonstrative aspects, radar processor 834 may be configured to generate the radar information 813 by calibrating the antenna MM of the MIMO radar antenna 881 to provide the radar information 813 including the AoA spectrum having a PSLL of at least 40 dB.

In some demonstrative aspects, radar processor 834 may be configured to generate the radar information 813 by calibrating the antenna MM of the MIMO radar antenna 881 to provide the radar information 813 including the AoA spectrum having a PSLL of at least 45 dB.

In some demonstrative aspects, radar processor 834 may be configured to generate the radar information 813 by calibrating the antenna MM of the MIMO radar antenna 881 to provide the radar information 813 including the AoA spectrum having a PSLL of at least 50 dB.

In some demonstrative aspects, radar processor 834 may be configured to generate the radar information 813 by calibrating the antenna MM of the MIMO radar antenna 881 to provide the radar information 813 including the AoA spectrum having a PSLL of at least 55 dB.

In other aspects, radar processor 834 may be configured to generate the radar information 813 by calibrating the antenna MM of the MIMO radar antenna 881 to provide the radar information 813 including the AoA spectrum having a PSLL of any other suitable level.

In some demonstrative aspects, the plurality of 1D ICMs my include a plurality of pre-calculated 1D ICMs according to a calibration setting, e.g., as described below.

In some demonstrative aspects, memory 838 may be configured to store one or more of the plurality of 1D ICMs, e.g., as described below.

In some demonstrative aspects, processor 836 may be configured to retrieve the one or more 1D ICMs from the memory 838, for example, for calibrating the antenna MM of MIMO radar antenna 881, e.g., as described below.

In some demonstrative aspects, memory 838 may be implemented as part of radar processor 834. In other aspects, memory 838 may be implemented as a dedicated memory and/or as part of radar frontend 804, and/or any other device or system implementing radar frontend 804 and/or radar processor 834, e.g., vehicle 100 (FIG. 1).

In some demonstrative aspects, processor 836 may be configured to retrieve the plurality of ICMs from the memory 838, and to generate the radar information 813 by calibrating the antenna MM of the MIMO radar antenna 881 based on the plurality of ICMs, e.g., as described below.

In some demonstrative aspects, processor 836 may be configured to map the input radar data 811 to a plurality of 1D slices corresponding to the plurality of antenna sub-arrays, respectively, e.g., as described below.

In some demonstrative aspects, processor 836 may be configured to determine a plurality of two-dimensional (2D) compensated responses for the plurality of 1D slices, respectively, e.g., as described below.

In some demonstrative aspects, a 2D compensated response corresponding to a 1D slice, which corresponds to an antenna sub-array, may be based on a plurality of 1D ICMs corresponding to the antenna sub-array and to the plurality of angles in the second dimension of the Azimuth-Elevation domain, e.g., as described below.

In some demonstrative aspects, processor 836 may be configured to determine a compensated 2D Azimuth-Elevation beamforming response based on the plurality of 2D compensated responses, e.g., as described below.

In some demonstrative aspects, processor 836 may be configured to generate the radar information 813 based, for example, on the compensated 2D Azimuth-Elevation beamforming response, e.g., as described below.

In some demonstrative aspects, processor 836 may be configured to determine the 2D compensated response corresponding to the 1D slice, which corresponds to the antenna sub-array, for example, by determining a plurality of 1D compensated responses for the 1D slice, e.g., as described below.

In some demonstrative aspects, the plurality of 1D compensated responses may correspond, for example, to the plurality of angles in the second dimension of the Azimuth-Elevation domain, respectively, e.g., as described below.

In some demonstrative aspects, a 1D compensated response corresponding to the angle may be based, for example, on input radar 811 data mapped to the 1D slice, and on the 1D ICM corresponding to the combination of the antenna sub-array and the angle, e.g., as described below.

In some demonstrative aspects, processor 836 may be configured to determine the 2D compensated response corresponding to the 1D slice, which corresponds to the antenna sub-array, for example, based on a combination of the plurality of 1D compensated responses for the 1D slice, e.g., as described below.

In some demonstrative aspects, processor 836 may be configured to determine the 2D compensated response corresponding to the 1D slice, which corresponds to the antenna sub-array, for example, based on a concatenation of the plurality of 1D compensated responses for the 1D slice, e.g., as described below.

Figure 14:
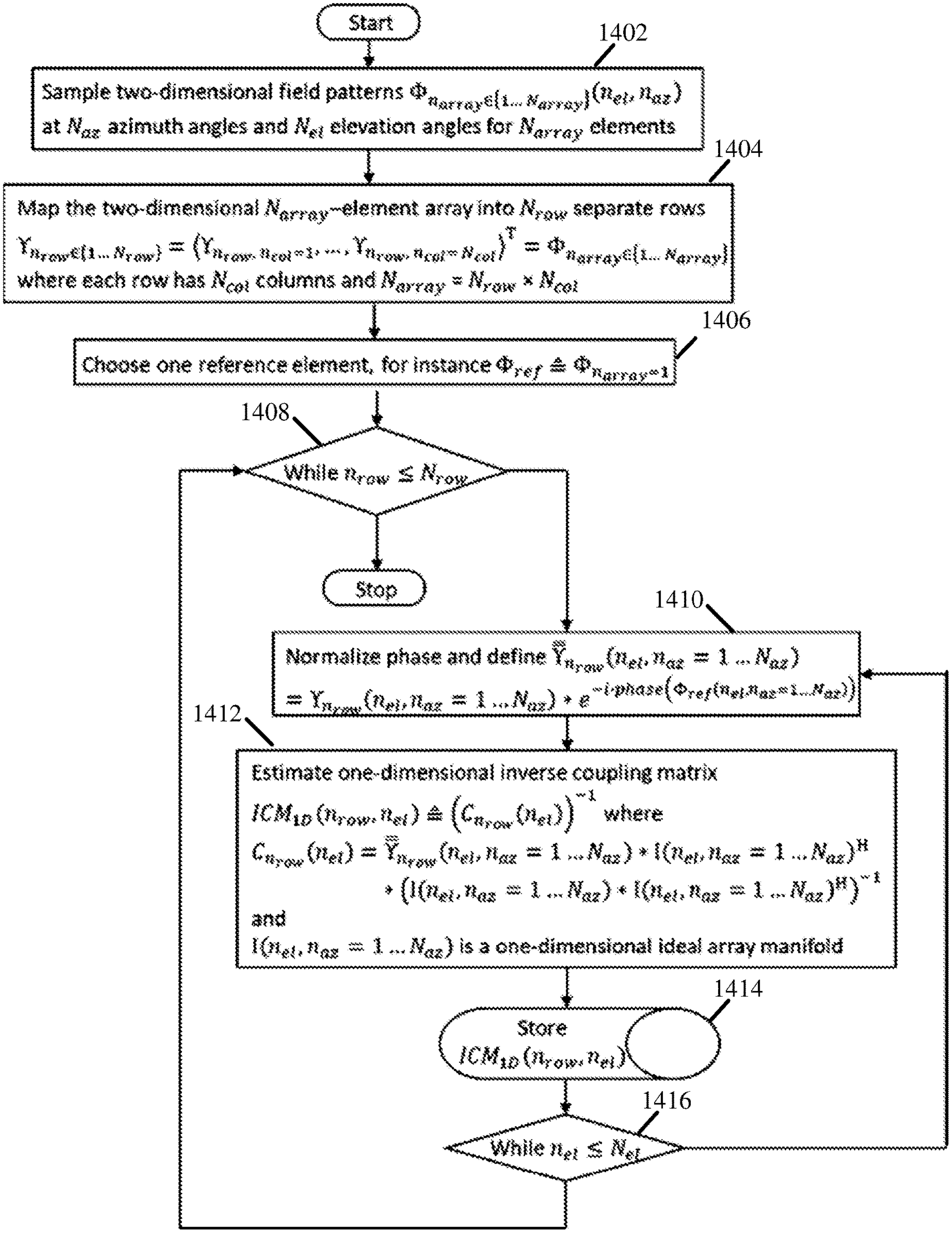
FIG. 14 is a schematic flow-chart illustration of a method of determining a plurality of Inverse Coupling Matrices (ICMs) to calibrate a mismatch of a MIMO antenna, in accordance with some demonstrative aspects.

Reference is made to FIG. 14, which schematically illustrates a method of determining a plurality of ICMs to calibrate a mismatch of a MIMO antenna, in accordance with some demonstrative aspects.

In some demonstrative aspects, radar processor 834 (FIG. 8), processor 836 (FIG. 8), and/or mismatch calibrator 871 (FIG. 8) may be configured to implement one or more operations of the method of FIG. 14 to determine one or more of the ICMs to calibrate the antenna mismatch of MIMO array 881 (FIG. 8).

In some demonstrative aspects, radar processor 834 (FIG. 8), processor 836 (FIG. 8), and/or mismatch calibrator 871 (FIG. 8) may be configured to implement one or more operations of the method of FIG. 14 to determine one or more of the ICMs to calibrate the antenna mismatch of MIMO array 881 (FIG. 8), for example, according to a calibration setting.

In some demonstrative aspects, for example, the estimated ICMs may be stored, e.g., in memory 838 (FIG. 8), for example, for later use by radar processor 834 (FIG. 8) and/or mismatch calibrator 871 (FIG. 8) with respect to Rx input data 811 (FIG. 8) of signals received via MIMO antenna 881 (FIG. 8).

As indicated at block 1402, the method may include sampling 2D patterns at a plurality of azimuth angles, e.g., $N_{az}$ angles, and a plurality of elevation angles, e.g., $N_{el}$ angles, for example, for a plurality of antenna elements, e.g., for each of $N_{array}$ elements in the MIMO array 881 (FIG. 8).

As indicated at block 1404, the method may include mapping the 2D patterns of the $N_{array}$ elements to a plurality of rows, e.g., to $N_{row}$ rows, for example, corresponding to rows of the antennas in the MIMO array 881 (FIG. 8).

As indicated at block 1406, the method may include selecting one of the antenna elements as a reference element for calibration of the remaining elements.

As indicated at block 1408, the method may include iterating over the plurality of rows.

As indicated at block 1416, the method may include iterating over the plurality of elevation angles.

As indicated at blocks 1410 and 1412, the method may include estimating an ICM corresponding to a combination of a row and an elevation angle based on the 2D patterns mapped to the row.

As indicated at block 1414, the method may include storing the ICM. For example, the ICM may be stored, e.g., by processor 836 (FIG. 8), in memory 838 (FIG. 8).

Figure 15:
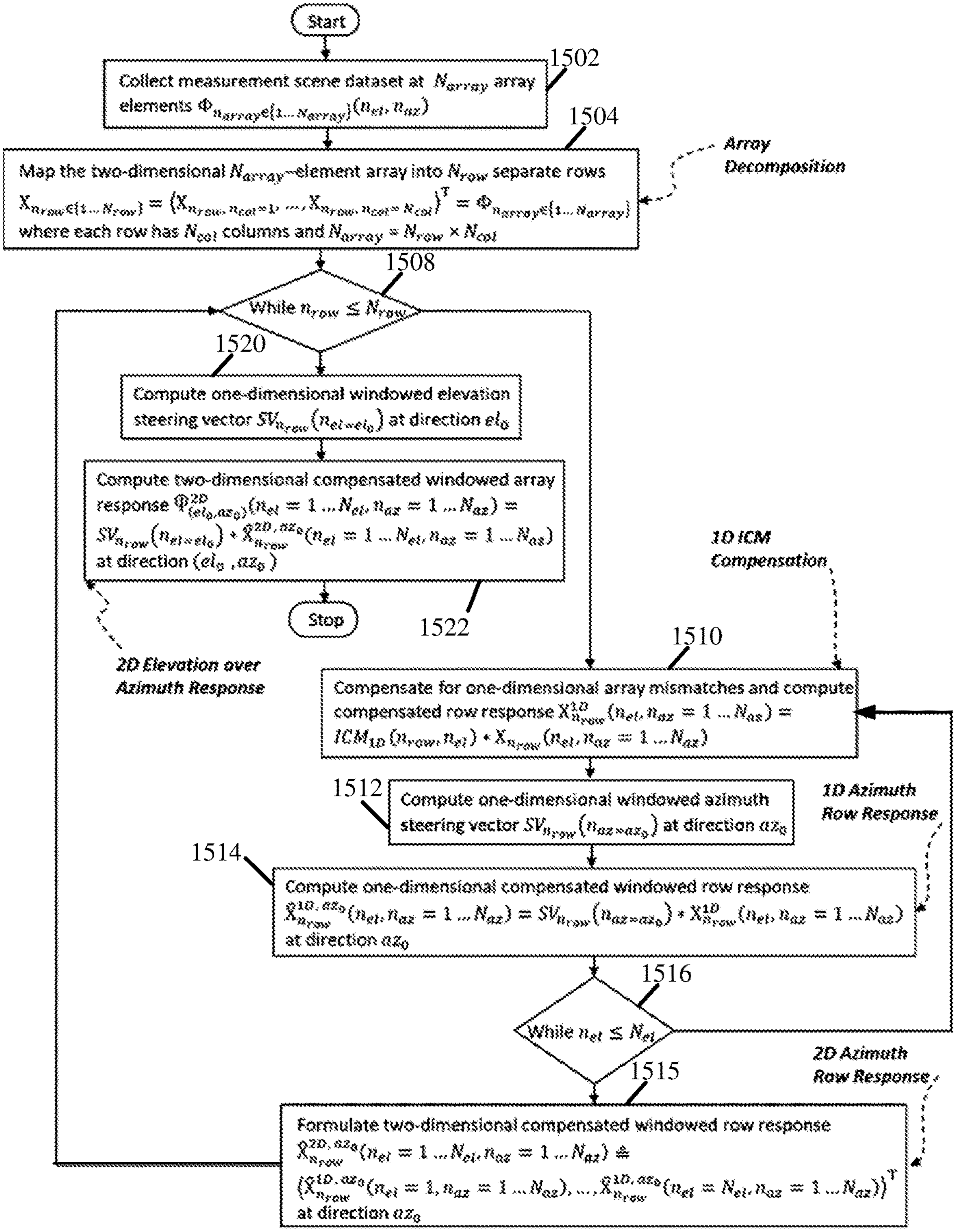
FIG. 15 is a schematic flow-chart illustration of a method of calibrating a mismatch of a MIMO antenna, in accordance with some demonstrative aspects.

Reference is made to FIG. 15, which schematically illustrates a method of calibrating a mismatch of a MIMO antenna, in accordance with some demonstrative aspects.

In some demonstrative aspects, radar processor 834 (FIG. 8), processor 836 (FIG. 8), and/or mismatch calibrator 871 (FIG. 8) may be configured to implement one or more operations of the method of FIG. 15 to calibrate the antenna mismatch of MIMO array 881 (FIG. 8).

In some demonstrative aspects, radar processor 834 (FIG. 8), processor 836 (FIG. 8), and/or mismatch calibrator 871 (FIG. 8) may be configured to perform one or more operations of the method of FIG. 15 using one or more ICMs, e.g., pre-calculated ICMs, which may be retrieved from memory 838 (FIG. 1). For example, the one or more ICMs may be pre-calculated and/or predefined, e.g., based on one or more operations of the method of FIG. 14.

In some demonstrative aspects, as indicated at blocks 1502 and 1504, the method may include mapping Rx input data representing radar signals of the MIMO antenna to a plurality of 1D slices corresponding to a plurality of antenna sub-arrays of the MIMO antenna, respectively.

For example, as indicated at block 1502, the method may include receiving 2D patterns at a plurality of azimuth angles, e.g., $N_{az}$ angles, and a plurality of elevation angles, e.g., $N_{el}$ angles, for example, for a plurality of antenna elements, e.g., for each of $N_{array}$ elements in the MIMO antenna 881 (FIG. 8). For example, the 2D patterns may be based on the Rx input data 811 (FIG. 8), e.g., as described above.

For example, as indicated at block 1504, the method may include mapping the 2D patterns of the $N_{array}$ elements to a plurality of rows, e.g., to $N_{row}$ rows, for example, corresponding to rows of the antennas in the MIMO antenna.

In one example, the input 2D patterns may include raw data in array format, for example, including $N_{array}$ complex matrices $\phi_{n_{array}}$ of size $N_{az} \times N_{el}$.

As indicated at block 1508, the method may include iterating over the plurality of rows.

As indicated at block 1516, the method may include iterating over the plurality of elevation angles.

As indicated at blocks 1510, 1512 and 1514, the method may include determining a plurality of 2D compensated responses for the plurality of 1D slices, respectively, e.g., as described below.

For example, as indicated at block 1510, the method may include performing a 1D ICM compensation.

For example, for a given row and elevation angle, correction coefficients including a complex matrix $ICM_{1D}(n_{row}, n_{el})$ of size $N_{col} \times N_{col}$ may be applied to uncompensated data including $N_{col}$ complex vectors $X_{n_{row}}(n_{el}, n_{az}=1 \ldots N_{az})$ of size $N_{az}$, for example, in order to determine, for the given row and elevation angle, compensated data including $N_{col}$ complex vectors $$X^{1D}_{n_{row}}(n_{el}, n_{az} = 1 \ldots N_{az})$$

of size $N_{az}$.

For example, as indicated at block 1510, the method may include computing a one-dimensional windowed azimuth steering vector, for example, corresponding to the given row.

For example, as indicated at block 1514, the method may include determining a 1D Azimuth Row Response corresponding to the given row.

For example, for the given row and elevation angle, the steering vector, e.g., $SV_{n_{row}}(n_{az=az_0})$ of size $N_{col}$, may be applied to the compensated data, e.g., including the $N_{col}$ complex vectors $$X^{1D}_{n_{row}}(n_{el}, n_{az} = 1 \ldots N_{az})$$

of size $N_{az}$, to determine, for the given row and elevation angle, an azimuth beamforming response, e.g., including a complex vector $$\hat{X}^{1D,az_0}_{n_{row}}(n_{el}, n_{az} = 1 \ldots N_{az})$$

of size $N_{az}$.

As indicated at block 1518, the method may include determining 2D Azimuth Row Response corresponding to the given row.

For example, for the given row, the 1D azimuth responses for all elevation angles, e.g., including the complex vectors $$\hat{X}^{1D,az_0}_{n_{row}}(n_{el}, n_{az} = 1 \ldots N_{az})$$

of size $N_{az}$, may be combined, e.g., concatenated, to provide a 2D azimuth response for the given row, e.g., in the form of a complex matrix $$\hat{X}^{2D,az_0}_{n_{row}}(n_{el} = 1 \ldots N_{el}, n_{az} = 1 \ldots N_{az})$$

of size $N_{az} \times N_{el}$.

As indicated at blocks 1520 and 1522, the method may include determining a 2D Elevation over Azimuth Response, for example, based on the 2D Azimuth Row Responses corresponding to the plurality of rows.

For example, a 2D elevation over azimuth beamforming response, e.g., including a complex matrix $$\Psi^{2D}_{(el_0,az_0)}(n_{el} = 1 \ldots N_{el}, n_{az} = 1 \ldots N_{az}) \text{ of size } N_{az} \times N_{el},$$

may be determined based, for example, on a steering vector $SV_{n_{row}}(n_{el=el_0})$ of size $N_{el}$, and based on the 2D azimuth response for all rows, e.g., including the $N_{row}$ complex matrices $$\hat{X}^{2D,az_0}_{n_{row}}(n_{el} = 1 \ldots N_{el}, n_{az} = 1 \ldots N_{az})$$

of size $N_{az} \times N_{el}$.

Figure 16:
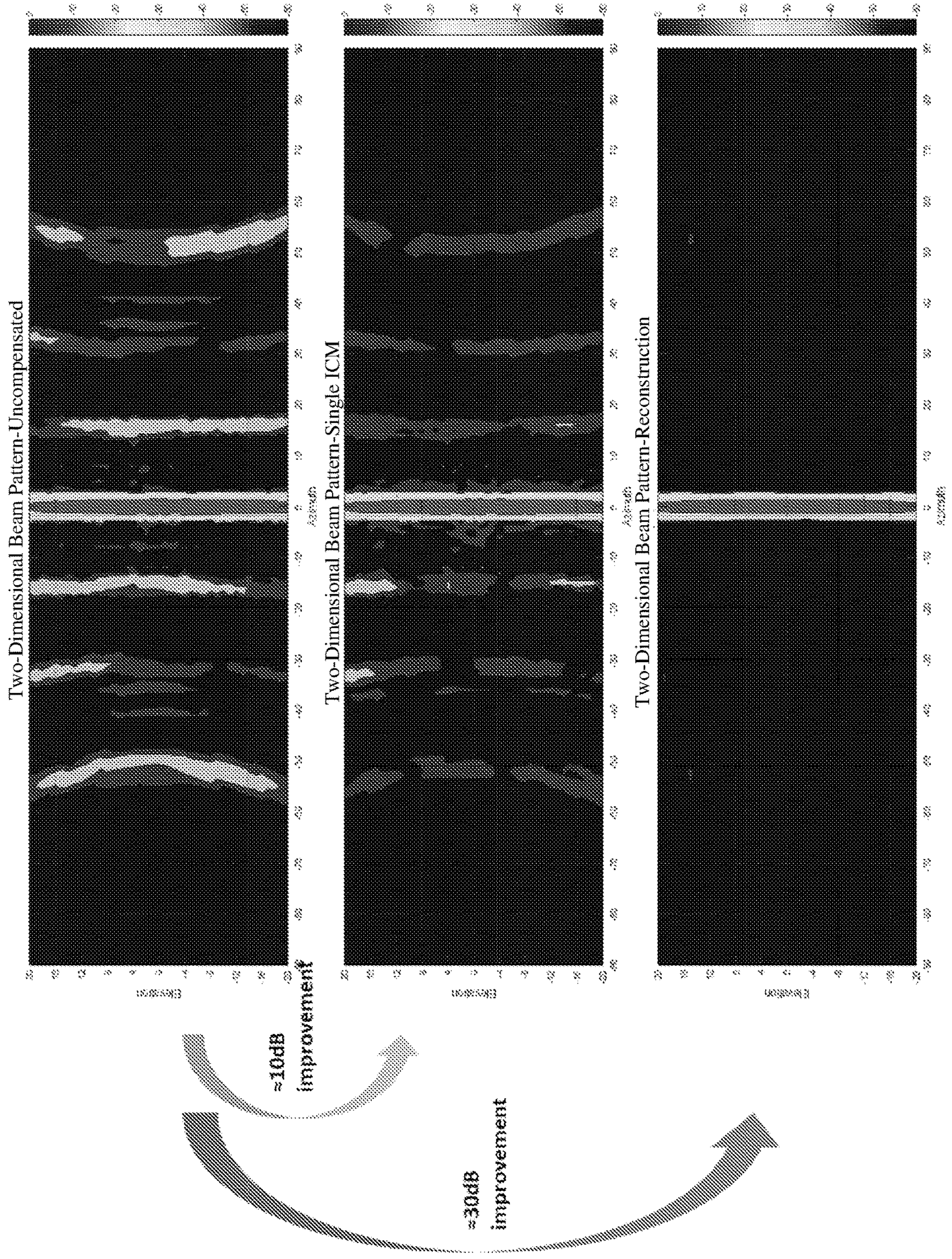
FIG. 16 is a schematic illustration of graphs depicting an improvement achieved by a compensated two-dimensional beam pattern of a row of a MIMO antenna scanned to zero degrees in azimuth, in accordance with some demonstrative aspects.

Reference is made to FIG. 16, which schematically illustrates graphs depicting an improvement, which may be achieved by a compensated two-dimensional beam pattern of a row of a MIMO antenna scanned to zero degrees in azimuth, in accordance with some demonstrative aspects.

In some demonstrative aspects, as shown in the middle graph of FIG. 16, an improvement of about 10 dB may be achieved by applying an antenna MM calibration based on a single ICM, e.g., compared to a case (top graph) with no antenna MM calibration.

In some demonstrative aspects, as shown in the bottom graph of FIG. 16, an improvement of about 30 dB may be achieved by applying an antenna MM calibration based on a plurality of ICMs, e.g., as described above, compared to the case (top graph) with no antenna MM calibration.

In some demonstrative aspects, as shown in FIG. 16, the antenna MM calibration based on the plurality of ICMs, e.g., as described above, may achieve significantly better performance, for example, with respect to compensating the array mismatches, e.g., even in case of lack of separability in the two-dimensional beam patterns between array elements.

Figure 17:
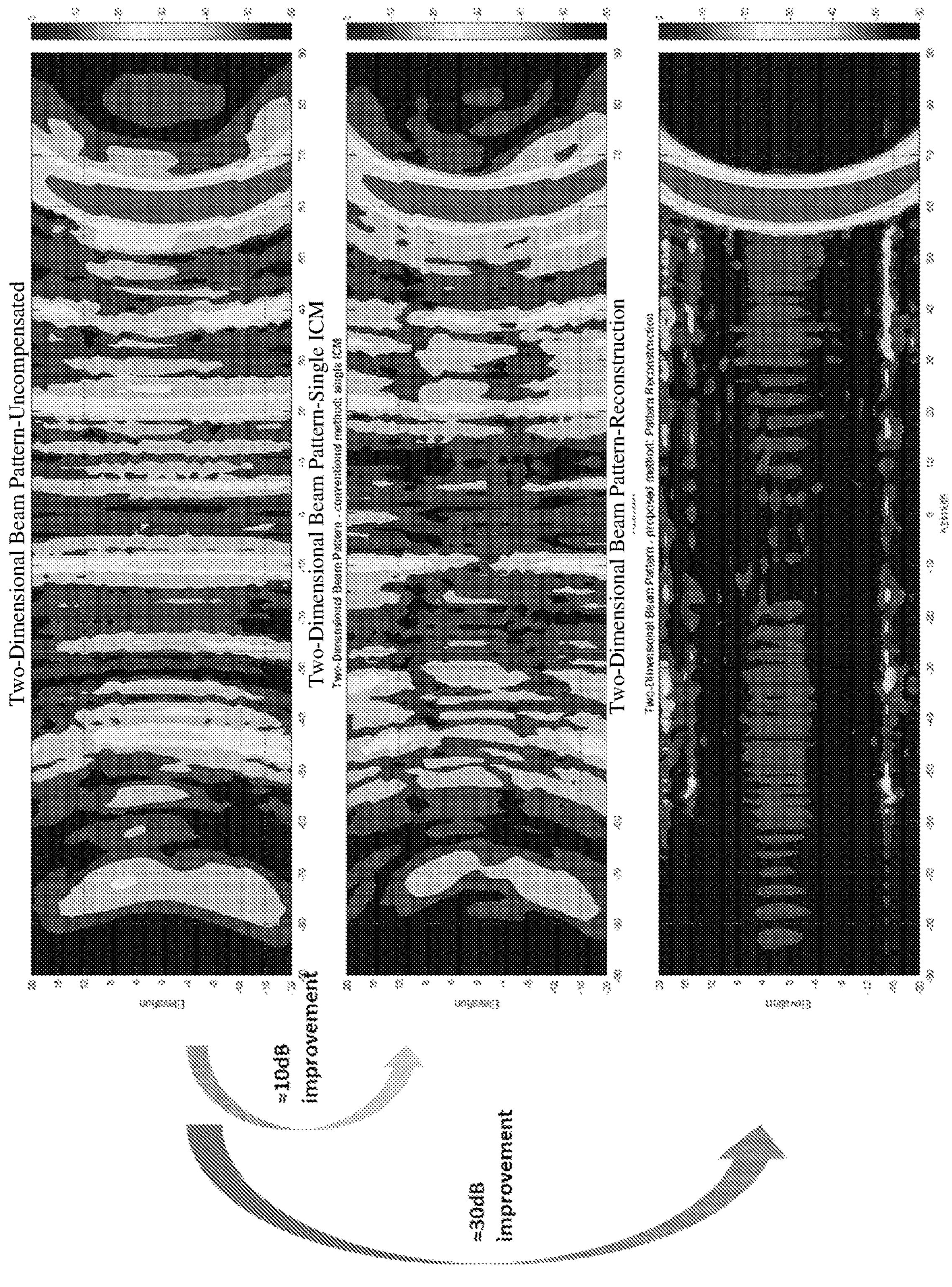
FIG. 17 is a schematic illustration of graphs depicting an improvement achieved by a compensated two-dimensional beam pattern of a row of a MIMO antenna scanned to 60 degrees azimuth, in accordance with some demonstrative aspects.

Reference is made to FIG. 17, which schematically illustrates graphs depicting an improvement, which may be achieved by a compensated two-dimensional beam pattern of a row of a MIMO antenna scanned to 60 degrees azimuth, in accordance with some demonstrative aspects.

In some demonstrative aspects, as shown in the middle graph of FIG. 17, an improvement of about 10 dB may be achieved by applying an antenna MM calibration based on a single ICM, e.g., compared to a case (top graph) with no antenna MM calibration.

In some demonstrative aspects, as shown in the bottom graph of FIG. 17, an improvement of about 30 dB may be achieved by applying an antenna MM calibration based on a plurality of ICMs, e.g., as described above, compared to the case (top graph) with no antenna MM calibration.

In some demonstrative aspects, as shown in FIG. 17, the antenna MM calibration based on the plurality of ICMs, e.g., as described above, may achieve significantly better performance, for example, with respect to compensating for the array mismatches, e.g., even in case of lack of separability in the two-dimensional beam patterns between array elements.

Figure 18:
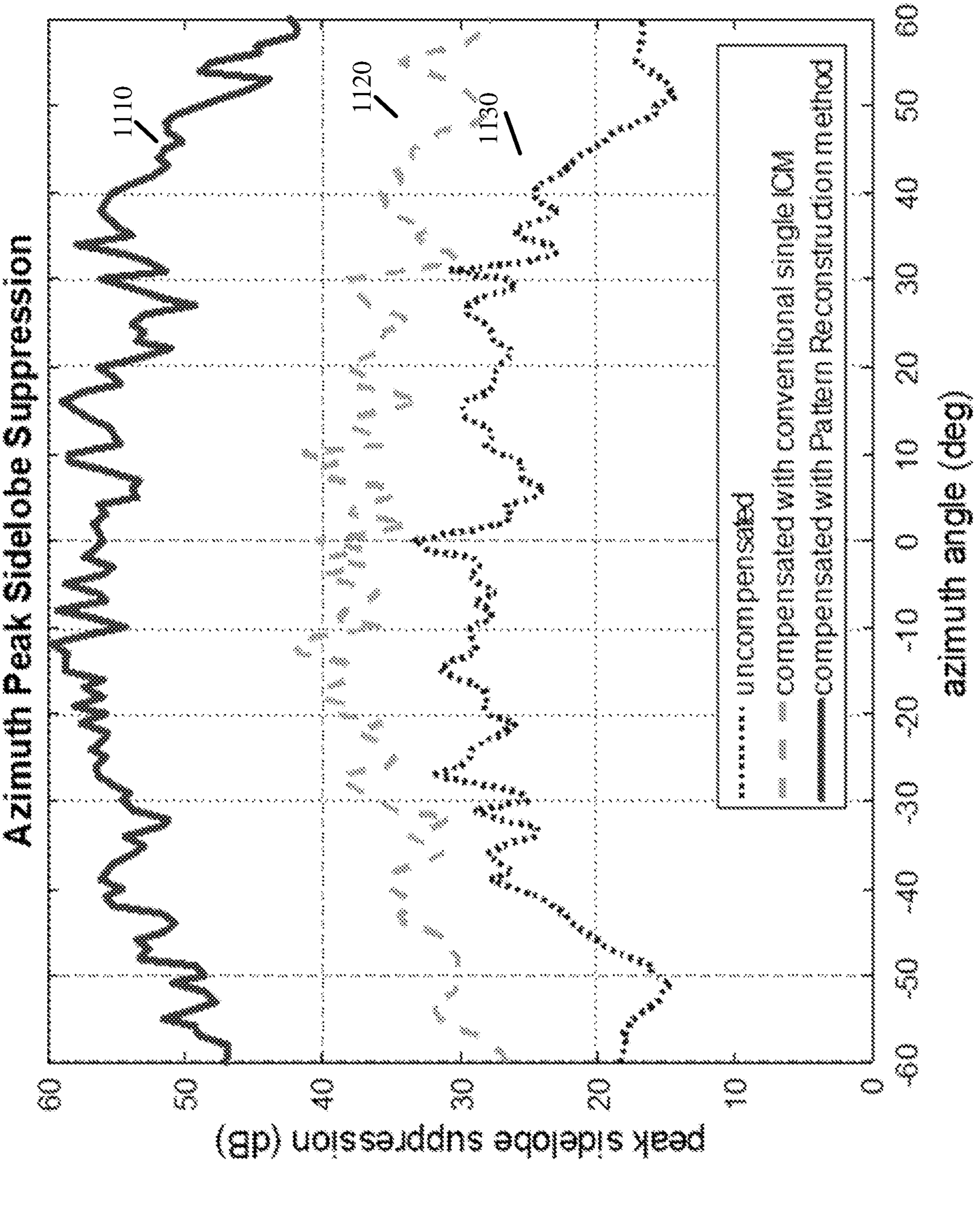
FIG. 18 is a schematic illustration of a graph depicting an improved azimuth peak sidelobe suppression at an elevation of zero degrees, which may be achieved in accordance with some demonstrative aspects.

Reference is made to FIG. 18, which schematically illustrates a graph depicting improved azimuth peak sidelobe suppression at an elevation of zero degrees, which may be achieved in accordance with some demonstrative aspects. For example, the graphs of FIG. 18 represent a cut at elevation=0 deg of the two-dimensional beam patterns when the beam is scanned in azimuth at a 1 deg step from −60 deg to +60 deg.

In some demonstrative aspects, as shown in FIG. 18, an improved peak sidelobe suppression (curve 1810) of more than 40 dB may be achieved by applying an antenna MM calibration based on a plurality of ICMs, e.g., as described above.

In some demonstrative aspects, as shown in FIG. 18, the performance of the antenna MM calibration based on the plurality of ICMs (curve 1810) may be significantly better than the peak sidelobe suppression, which may be achieved by applying a single ICM (curve 1820), and significantly better than the peak sidelobe suppression, which may be achieved without antenna MM calibration (curve 1830).

In some demonstrative aspects, as shown in FIG. 18, applying the antenna MM calibration based on the plurality of ICMs, e.g., as described above, may provide the improved peak sidelobe suppression (curve 1810) of at least 45 dB in a wide range of azimuth angles, e.g., between about −60 degrees and +55 degrees.

In some demonstrative aspects, as shown in FIG. 18, applying the antenna MM calibration based on the plurality of ICMs, e.g., as described above, may provide the improved peak sidelobe suppression (curve 1810) of at least 50 dB in a wide range of azimuth angles, e.g., between about −55 degrees and +50 degrees.

In some demonstrative aspects, as shown in FIG. 18, applying the antenna MM calibration based on the plurality of ICMs, e.g., as described above, may provide the improved peak sidelobe suppression (curve 1810) of at least 55 dB in a wide range of azimuth angles, e.g., between about −40 degrees and +40 degrees.

In some demonstrative aspects, as shown in FIG. 18, applying the antenna MM calibration based on the plurality of ICMs, e.g., as described above, may provide the improved peak sidelobe suppression (curve 1810) of up to about 60 dB in some azimuth angles, e.g., between about −20 degrees and +20 degrees.

In some demonstrative aspects, as shown in FIG. 18, the antenna MM calibration based on the plurality of ICMs, e.g., as described above, may achieve significantly better performance, for example, with respect to compensating for the array mismatches, e.g., even in case of lack of separability in the two-dimensional beam patterns between array elements.

Figure 19:
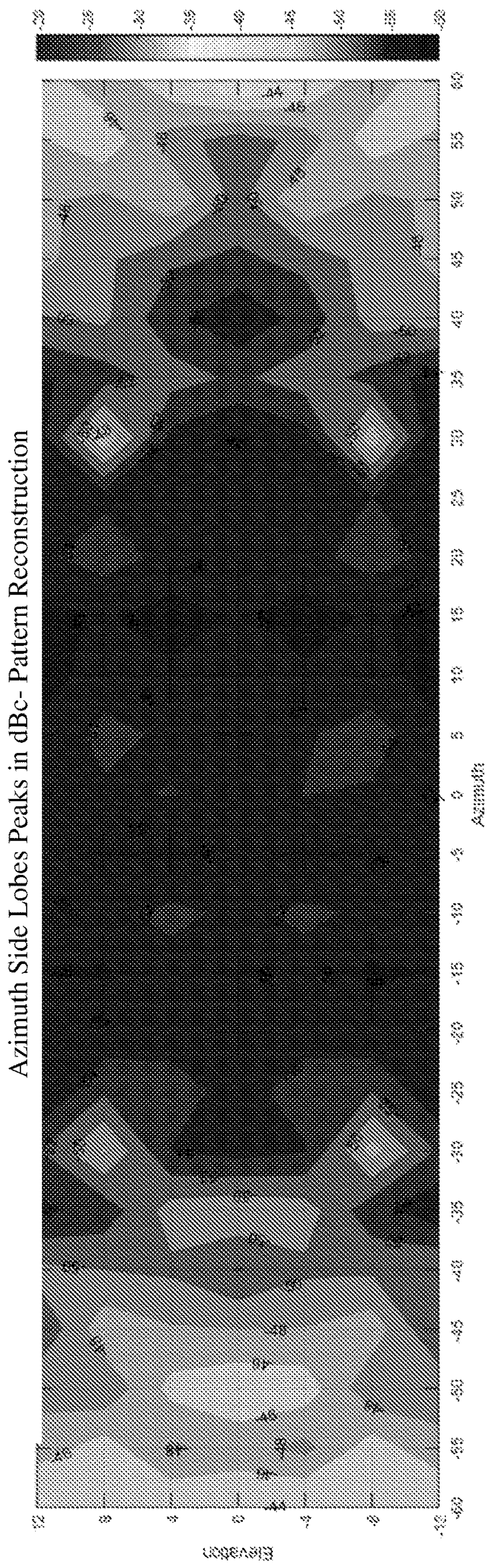
FIG. 19 is a schematic illustration of a graph depicting an improved azimuth peak sidelobe suppression for a full planar array scanning, which may be achieved in accordance with some demonstrative aspects.

Reference is made to FIG. 19, which schematically illustrates a graph depicting an improved azimuth peak sidelobe suppression for a full planar array scanning, which may be achieved in accordance with some demonstrative aspects.

In some demonstrative aspects, as shown in FIG. 19, the antenna MM calibration based on the plurality of ICMs, e.g., as described above, may be implemented to achieve an overall improvement in azimuth peak side lobe levels, e.g., for a full planar array that is scanned both in azimuth and elevation.

For example, as shown in FIG. 19, a peak side lobe suppression level better than 50 dB is demonstrated at moderate azimuth scan angles, e.g., in the range [−40:40] deg, and a peak side lobe suppression level better than 40 dB is demonstrated over the entire field of view.

Figure 20:
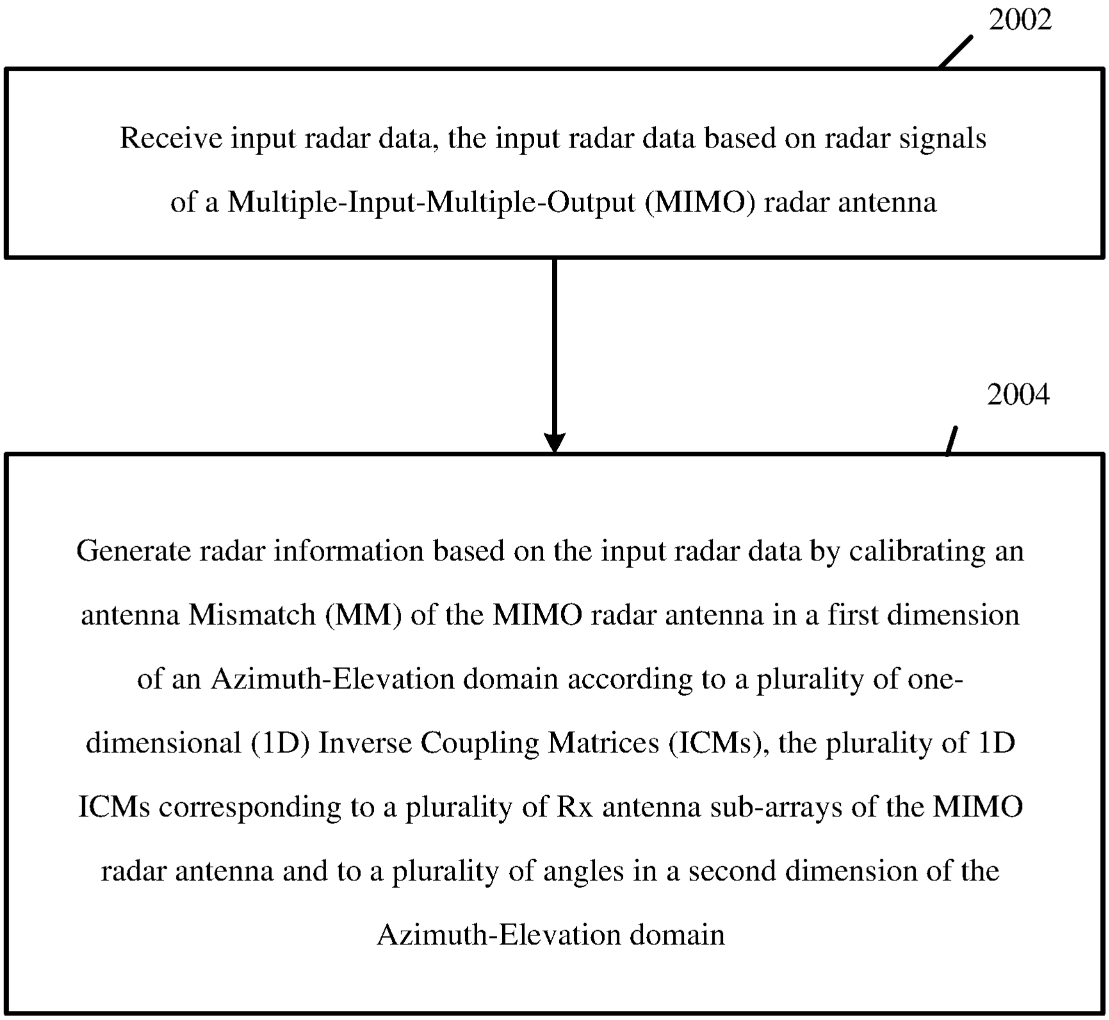
FIG. 20 is a schematic flow-chart illustration of a method of radar antenna calibration, in accordance with some demonstrative aspects.

Reference is made to FIG. 20, which schematically illustrates a method of radar antenna calibration, in accordance with some demonstrative aspects. For example, one or more of the operations of the method of FIG. 20 may be performed by one or more elements of a system, for example, a vehicle, e.g., vehicle 100 (FIG. 1), a radar device, e.g., radar device 101 (FIG. 1), a mismatch calibrator, e.g., mismatch calibrator 871 (FIG. 8), and/or a processor, e.g., radar processor 834 (FIG. 8) and/or processor 836 (FIG. 8).

As indicated at block 2002, the method may include processing input radar data, which may be based on radar signals of a MIMO radar antenna, e.g., radar signals received via a plurality of Rx antennas of the MIMO radar antenna. For example, radar processor 834 (FIG. 8) may process the input radar data 811 (FIG. 8), e.g., as described above.

As indicated at block 2004, the method may include generating radar information based on the input radar data, for example, by calibrating an antenna MM of the MIMO radar antenna in a first dimension of an Azimuth-Elevation domain according to a plurality of one-dimensional (1D) Inverse Coupling Matrices (ICMs), wherein the plurality of 1D ICMs correspond to a plurality of antenna sub-arrays of the MIMO radar antenna and to a plurality of angles in a second dimension of the Azimuth-Elevation domain. For example, antenna MM calibrator 871 (FIG. 8) may calibrate the antenna MM of the MIMO radar antenna 881 (FIG. 8), e.g., as described above.

Figure 21:
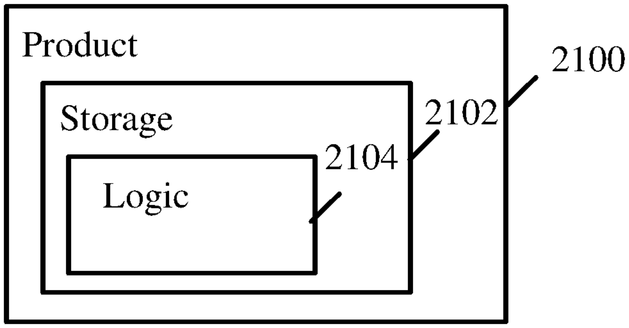
FIG. 21 is a schematic illustration of a product of manufacture, in accordance with some demonstrative aspects.

Reference is made to FIG. 21, which schematically illustrates a product of manufacture 2100, in accordance with some demonstrative aspects. Product 2100 may include one or more tangible computer-readable ("machine-readable") non-transitory storage media 2102, which may include computer-executable instructions, e.g., implemented by logic 2104. The computer-executable instructions, e.g., implemented by logic 2104, may be operable to, when executed by at least one computer processor, enable the at least one computer processor to implement one or more operations at a vehicle, e.g., vehicle 100 (FIG. 1), a radar device, e.g., radar device 101 (FIG. 1), a mismatch calibrator, e.g., mismatch calibrator 871 (FIG. 8), and/or a processor, e.g., radar processor 834 (FIG. 8) and/or processor 836 (FIG. 8); to cause a vehicle, e.g., vehicle 100 (FIG. 1), a radar device, e.g., radar device 101 (FIG. 1), a mismatch calibrator, e.g., mismatch calibrator 871 (FIG. 8), and/or a processor, e.g., radar processor 834 (FIG. 8) and/or processor 836 (FIG. 8), to perform, trigger and/or implement one or more operations and/or functionalities; and/or to perform, trigger and/or implement one or more operations and/or functionalities described with reference to one or more of the FIGS. 1-20, and/or one or more operations described herein. The phrases "non-transitory machine-readable medium" and "computer-readable non-transitory storage media" may be directed to include all machine and/or computer readable media, with the sole exception being a transitory propagating signal.

In some demonstrative aspects, product 2100 and/or storage media 2102 may include one or more types of computer-readable storage media capable of storing data, including volatile memory, non-volatile memory, removable or non-removable memory, erasable or non-erasable memory, writeable or re-writeable memory, and the like. For example, storage media 2102 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 2104 may include instructions, data, and/or code, which, if executed by a machine, may cause the machine to perform a method, process, and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 2104 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner, or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further aspects.

Example 1 includes an apparatus comprising an input to receive input radar data, the input radar data based on radar signals of a Multiple-Input-Multiple-Output (MIMO) radar antenna; and a processor to generate radar information based on the input radar data, the processor configured to calibrate an antenna Mismatch (MM) of the MIMO radar antenna in a first dimension of an Azimuth-Elevation domain according to a plurality of one-dimensional (1D) Inverse Coupling Matrices (ICMs), the plurality of 1D ICMs corresponding to a plurality of antenna sub-arrays of the MIMO radar antenna and to a plurality of angles in a second dimension of the Azimuth-Elevation domain, wherein a 1D ICM of the plurality of 1D ICMs corresponds to a combination of an antenna sub-array of the plurality of antenna sub-arrays and an angle of the plurality of angles in the second dimension of the Azimuth-Elevation domain.

Example 2 includes the subject matter of Example 1, and optionally, wherein the plurality of 1D ICMs comprises a plurality of pre-calculated 1D ICMs according to a calibration setting.

Example 3 includes the subject matter of Example 1 or 2, comprising a memory to store one or more of the plurality of 1D ICMs, the processor configured to retrieve the one or more 1D ICMs from the memory.

Example 4 includes the subject matter of any one of Examples 1-3, and optionally, wherein the processor is configured to map the input radar data to a plurality of 1D slices corresponding to the plurality of antenna sub-arrays, respectively; determine a plurality of two-dimensional (2D) compensated responses for the plurality of 1D slices, respectively, wherein a 2D compensated response corresponding to a 1D slice, which corresponds to the antenna sub-array, is based on a plurality of 1D ICMs corresponding to the antenna sub-array and to the plurality of angles in the second dimension of the Azimuth-Elevation domain; determine a compensated 2D Azimuth-Elevation beamforming response based on the plurality of 2D compensated responses; and generate the radar information based on the compensated 2D Azimuth-Elevation beamforming response.

Example 5 includes the subject matter of Example 4, and optionally, wherein the processor is configured to determine the 2D compensated response corresponding to the 1D slice, which corresponds to the antenna sub-array, by determining a plurality of 1D compensated responses for the 1D slice, the plurality of 1D compensated responses corresponding to the plurality of angles in the second dimension of the Azimuth-Elevation domain, respectively, wherein a 1D compensated response corresponding to the angle is based on input radar data mapped to the 1D slice, and on the 1D ICM corresponding to the combination of the antenna sub-array and the angle; and determining the 2D compensated response corresponding to the 1D slice based on a combination of the plurality of 1D compensated responses for the 1D slice.

Example 6 includes the subject matter of any one of Examples 1-5, and optionally, wherein the 1D ICM comprises a square matrix of n columns and n rows, wherein n is based on a count of antenna elements in the antenna sub-array.

Example 7 includes the subject matter of any one of Examples 1-6, and optionally, wherein the plurality of 1D ICMs comprises a first 1D ICM corresponding to the antenna sub-array and a second 1D ICM corresponding to the antenna sub-array, the first 1D ICM is different from the second 1D ICM, wherein the first 1D ICM corresponds to a first combination of the antenna sub-array and a first angle of the plurality of angles in the second dimension of the Azimuth-Elevation domain, wherein the second 1D ICM corresponds to a second combination of the antenna sub-array and a second angle of the plurality of angles in the second dimension of the Azimuth-Elevation domain.

Example 8 includes the subject matter of any one of Examples 1-7, and optionally, wherein the plurality of 1D ICMs comprises a first 1D ICM corresponding to the angle and a second ICM corresponding to the angle, the first 1D ICM is different from the second 1D ICM, wherein the first 1D ICM corresponds to a first combination of a first antenna sub-array and the angle, wherein the second 1D ICM corresponds to a second combination of a second antenna sub-array and the angle.

Example 9 includes the subject matter of any one of Examples 1-8, and optionally, wherein the first dimension of the Azimuth-Elevation domain comprises an azimuth dimension, the second dimension of the Azimuth-Elevation domain comprises an elevation dimension, the plurality of antenna sub-arrays of the MIMO radar antenna comprises a plurality of rows of the MIMO radar antenna, and the 1D ICM corresponds to a combination of a row and an elevation angle.

Example 10 includes the subject matter of any one of Examples 1-8, and optionally, wherein the first dimension of the Azimuth-Elevation domain comprises an elevation dimension, the second dimension of the Azimuth-Elevation domain comprises an azimuth dimension, the plurality of antenna sub-arrays of the MIMO radar antenna comprises a plurality of columns of the MIMO radar antenna, and the 1D ICM corresponds to a combination of a column and an azimuth angle.

Example 11 includes the subject matter of any one of Examples 1-10, and optionally, wherein the MIMO radar antenna comprises a rectangular MIMO antenna array.

Example 12 includes the subject matter of any one of Examples 1-11, and optionally, wherein the plurality of antenna sub-arrays of the MIMO radar antenna comprises a plurality of antenna sub-arrays in a virtual MIMO array formed as a convolution of a plurality of Receive (Rx) antennas and a plurality of Transmit (Tx) antennas.

Example 13 includes the subject matter of any one of Examples 1-12, and optionally, wherein the processor is configured to generate the radar information comprising an Angle of Arrival (AoA) spectrum in the first dimension of the Azimuth-Elevation domain, the processor configured to calibrate the antenna MM of the MIMO radar antenna such that the AoA spectrum has a Peak Side Lobe Level (PSLL) of at least 30 decibel (dB), wherein the PSLL is determined as a difference between a power level of a main-lobe of the AoA spectrum and a power level of a peak side-lobe corresponding to the main-lobe in the AoA spectrum.

Example 14 includes the subject matter of Example 13, and optionally, wherein the processor is configured to generate the radar information by calibrating the antenna MM of the MIMO radar antenna to provide the radar information including the AoA spectrum having a PSLL of at least 40 dB.

Example 15 includes the subject matter of Example 13, and optionally, wherein the processor is configured to generate the radar information by calibrating the antenna MM of the MIMO radar antenna to provide the radar information including the AoA spectrum having a PSLL of at least 50 dB.

Example 16 includes the subject matter of Example 13, and optionally, wherein the processor is configured to generate the radar information by calibrating the antenna MM of the MIMO radar antenna to provide the radar information including the AoA spectrum having a PSLL of at least 55 dB.

Example 17 includes the subject matter of any one of Examples 1-16, and optionally, comprising the MIMO radar antenna.

Example 18 includes the subject matter of any one of Examples 1-17, and optionally, comprising a radar device.

Example 19 includes the subject matter of Example 18, and optionally, comprising a Multiple-Input-Multiple-Output (MIMO) radar antenna comprising a plurality of Transmit (Tx) antennas to transmit Tx radar signals, and a plurality of Receive (Rx) antennas to receive Rx radar signals based on the Tx radar signals; and a processor configured to generate radar information based on input radar data, the input radar data based on the Rx radar signals, wherein the processor is configured to generate the radar information by calibrating an antenna Mismatch (MM) of the MIMO radar antenna in a first dimension of an Azimuth-Elevation domain according to a plurality of one-dimensional (1D) Inverse Coupling Matrices (ICMs), the plurality of 1D ICMs corresponding to a plurality of antenna sub-arrays of the MIMO radar antenna and to a plurality of angles in a second dimension of the Azimuth-Elevation domain, wherein a 1D ICM of the plurality of 1D ICMs corresponds to a combination of an antenna sub-array of the plurality of antenna sub-arrays and an angle of the plurality of angles in the second dimension of the Azimuth-Elevation domain.

Example 20 includes the subject matter of any one of Examples 1-19, and optionally, comprising a vehicle.

Example 21 includes the subject matter of Example 20, and optionally, comprising a system controller configured to control one or more vehicular systems of the vehicle based on radar information; and a radar device configured to provide the radar information to the system controller, the radar device comprising a Multiple-Input-Multiple-Output (MIMO) radar antenna comprising a plurality of Transmit (Tx) antennas to transmit Tx radar signals, and a plurality of Receive (Rx) antennas to receive Rx radar signals based on the Tx radar signals; and a processor configured to generate the radar information based on input radar data, the input radar data based on the Rx radar signals, wherein the processor is configured to generate the radar information by calibrating an antenna Mismatch (MM) of the MIMO radar antenna in a first dimension of an Azimuth-Elevation domain according to a plurality of one-dimensional (1D) Inverse Coupling Matrices (ICMs), the plurality of 1D ICMs corresponding to a plurality of antenna sub-arrays of the MIMO radar antenna and to a plurality of angles in a second dimension of the Azimuth-Elevation domain, wherein a 1D ICM of the plurality of 1D ICMs corresponds to a combination of an antenna sub-array of the plurality of antenna sub-arrays and an angle of the plurality of angles in the second dimension of the Azimuth-Elevation domain.

Example 22 includes an apparatus comprising means for executing any of the described operations of one or more of Examples 1-21.

Example 23 includes a machine-readable medium that stores instructions for execution by a processor to perform any of the described operations of one or more of Examples 1-21.

Example 24 includes an apparatus comprising a memory; and processing circuitry configured to perform any of the described operations of one or more of Examples 1-21.

Example 25 includes a method including any of the described operations of one or more of Examples 1-21.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:

an input to receive input radar data, the input radar data based on radar signals of a Multiple-Input-Multiple-Output (MIMO) radar antenna; and a processor to generate radar information based on the input radar data, the processor configured to calibrate an antenna Mismatch (MM) of the MIMO radar antenna in a first dimension of an Azimuth-Elevation domain according to a plurality of one-dimensional (1D) Inverse Coupling Matrices (ICMs), the plurality of 1D ICMs corresponding to a plurality of antenna sub-arrays of the MIMO radar antenna and to a plurality of angles in a second dimension of the Azimuth-Elevation domain, wherein a 1D ICM of the plurality of 1D ICMs corresponds to a combination of an antenna sub-array of the plurality of antenna sub-arrays and an angle of the plurality of angles in the second dimension of the Azimuth-Elevation domain.

2. The apparatus of claim 1, wherein the plurality of 1D ICMs comprises a plurality of pre-calculated 1D ICMs according to a calibration setting.

3. The apparatus of claim 1 comprising a memory to store one or more 1D ICMs of the plurality of 1D ICMs, the processor configured to retrieve the one or more 1D ICMs from the memory.

4. The apparatus of claim 1, wherein the processor is configured to:

map the input radar data to a plurality of 1D slices corresponding to the plurality of antenna sub-arrays, respectively;

determine a plurality of two-dimensional (2D) compensated responses for the plurality of 1D slices, respectively, wherein a 2D compensated response for a 1D slice corresponding to the antenna sub-array is based on a plurality of 1D ICMs corresponding to the antenna sub-array and to the plurality of angles in the second dimension of the Azimuth-Elevation domain;

determine a compensated 2D Azimuth-Elevation beamforming response based on the plurality of 2D compensated responses; and generate the radar information based on the compensated 2D Azimuth-Elevation beamforming response.

5. The apparatus of claim 4, wherein the processor is configured to determine the 2D compensated response for the 1D slice corresponding to the antenna sub-array by:

determining a plurality of 1D compensated responses for the 1D slice, the plurality of 1D compensated responses corresponding to the plurality of angles in the second dimension of the Azimuth-Elevation domain, respectively, wherein a 1D compensated response corresponding to the angle is based on input radar data mapped to the 1D slice, and on the 1D ICM corresponding to the combination of the antenna sub-array and the angle; and determining the 2D compensated response for the 1D slice based on a combination of the plurality of 1D compensated responses for the 1D slice.

6. The apparatus of claim 1, wherein the 1D ICM comprises a square matrix of n columns and n rows, wherein n is based on a count of antenna elements in the antenna sub-array.

7. The apparatus of claim 1, wherein the plurality of 1D ICMs comprises a first 1D ICM corresponding to the antenna sub-array and a second 1D ICM corresponding to the antenna sub-array, the first 1D ICM is different from the second 1D ICM, wherein the first 1D ICM corresponds to a first combination of the antenna sub-array and a first angle of the plurality of angles in the second dimension of the Azimuth-Elevation domain, wherein the second 1D ICM corresponds to a second combination of the antenna sub-array and a second angle of the plurality of angles in the second dimension of the Azimuth-Elevation domain.

8. The apparatus of claim 1, wherein the plurality of 1D ICMs comprises a first 1D ICM corresponding to the angle and a second 1D ICM corresponding to the angle, the first 1D ICM is different from the second 1D ICM, wherein the first 1D ICM corresponds to a first combination of a first antenna sub-array and the angle, wherein the second 1D ICM corresponds to a second combination of a second antenna sub-array and the angle.

9. The apparatus of claim 1, wherein the first dimension of the Azimuth-Elevation domain comprises an azimuth dimension, the second dimension of the Azimuth-Elevation domain comprises an elevation dimension, the plurality of antenna sub-arrays of the MIMO radar antenna comprises a plurality of rows of the MIMO radar antenna, and the 1D ICM corresponds to a combination of a row and an elevation angle.

10. The apparatus of claim 1, wherein the first dimension of the Azimuth-Elevation domain comprises an elevation dimension, the second dimension of the Azimuth-Elevation domain comprises an azimuth dimension, the plurality of antenna sub-arrays of the MIMO radar antenna comprises a plurality of columns of the MIMO radar antenna, and the 1D ICM corresponds to a combination of a column and an azimuth angle.

11. The apparatus of claim 1, wherein the MIMO radar antenna comprises a rectangular MIMO antenna array.

12. The apparatus of claim 1, wherein the plurality of antenna sub-arrays of the MIMO radar antenna comprises a plurality of antenna sub-arrays in a virtual MIMO array formed as a convolution of a plurality of Receive (Rx) antennas and a plurality of Transmit (Tx) antennas.

13. The apparatus of claim 1, wherein the processor is configured to generate the radar information comprising an Angle of Arrival (AoA) spectrum in the first dimension of the Azimuth-Elevation domain, the processor configured to calibrate the antenna MM of the MIMO radar antenna such that the AoA spectrum has a Peak Side Lobe Level (PSLL) of at least 30 decibel (dB), wherein the PSLL is determined as a difference between a power level of a main-lobe of the AoA spectrum and a power level of a peak side-lobe corresponding to the main-lobe in the AoA spectrum.

14. The apparatus of claim 13, wherein the processor is configured to generate the radar information by calibrating the antenna MM of the MIMO radar antenna to provide the radar information including the AoA spectrum having the PSLL of at least 40 dB.

15. The apparatus of claim 13, wherein the processor is configured to generate the radar information by calibrating the antenna MM of the MIMO radar antenna to provide the radar information including the AoA spectrum having the PSLL of at least 50 dB.

16. The apparatus of claim 13, wherein the processor is configured to generate the radar information by calibrating the antenna MM of the MIMO radar antenna to provide the radar information including the AoA spectrum having the PSLL of at least 55 dB.

17. A product comprising one or more tangible computer-readable non-transitory storage media comprising computer-executable instructions operable to, when executed by at least one processor, enable the at least one processor to cause a radar device to:

process input radar data, the input radar data based on radar signals of a Multiple-Input-Multiple-Output (MIMO) radar antenna; and generate radar information based on the input radar data by calibrating an antenna Mismatch (MM) of the MIMO radar antenna in a first dimension of an Azimuth-Elevation domain according to a plurality of one-dimensional (1D) Inverse Coupling Matrices (ICMs), the plurality of 1D ICMs corresponding to a plurality of antenna sub-arrays of the MIMO radar antenna and to a plurality of angles in a second dimension of the Azimuth-Elevation domain, wherein a 1D ICM of the plurality of 1D ICMs corresponds to a combination of an antenna sub-array of the plurality of antenna sub-arrays and an angle of the plurality of angles in the second dimension of the Azimuth-Elevation domain.

18. The product of claim 17, wherein the plurality of 1D ICMs comprises a plurality of pre-calculated 1D ICMs according to a calibration setting.

19. The product of claim 17, wherein the instructions, when executed, cause the radar device to:

map the input radar data to a plurality of 1D slices corresponding to the plurality of antenna sub-arrays, respectively;

determine a plurality of two-dimensional (2D) compensated responses for the plurality of 1D slices, respectively, wherein a 2D compensated response for a 1D slice corresponding to the antenna sub-array is based on a plurality of 1D ICMs corresponding to the antenna sub-array and to the plurality of angles in the second dimension of the Azimuth-Elevation domain;

determine a compensated 2D Azimuth-Elevation beamforming response based on the plurality of 2D compensated responses; and generate the radar information based on the compensated 2D Azimuth-Elevation beamforming response.

20. A radar device comprising:

a Multiple-Input-Multiple-Output (MIMO) radar antenna comprising a plurality of Transmit (Tx) antennas to transmit Tx radar signals, and a plurality of Receive (Rx) antennas to receive Rx radar signals based on the Tx radar signals; and a processor configured to generate radar information based on input radar data, the input radar data based on the Rx radar signals, wherein the processor is configured to generate the radar information by calibrating an antenna Mismatch (MM) of the MIMO radar antenna in a first dimension of an Azimuth-Elevation domain according to a plurality of one-dimensional (1D) Inverse Coupling Matrices (ICMs), the plurality of 1D ICMs corresponding to a plurality of antenna sub-arrays of the MIMO radar antenna and to a plurality of angles in a second dimension of the Azimuth-Elevation domain, wherein a 1D ICM of the plurality of 1D ICMs corresponds to a combination of an antenna sub-array of the plurality of antenna sub-arrays and an angle of the plurality of angles in the second dimension of the Azimuth-Elevation domain.

21. The radar device of claim 20 comprising a memory to store one or more 1D ICMs of the plurality of 1D ICMs, the processor configured to retrieve the one or more 1D ICMs from the memory.

22. The radar device of claim 20, wherein the processor is configured to:

map the input radar data to a plurality of 1D slices corresponding to the plurality of antenna sub-arrays, respectively;

determine a plurality of two-dimensional (2D) compensated responses for the plurality of 1D slices, respectively, wherein a 2D compensated response for a 1D slice corresponding to the antenna sub-array is based on a plurality of 1D ICMs corresponding to the antenna sub-array and to the plurality of angles in the second dimension of the Azimuth-Elevation domain;

determine a compensated 2D Azimuth-Elevation beamforming response based on the plurality of 2D compensated responses; and generate the radar information based on the compensated 2D Azimuth-Elevation beamforming response.

23. A vehicle comprising:

a system controller configured to control one or more vehicular systems of the vehicle based on radar information; and a radar device configured to provide the radar information to the system controller, the radar device comprising:

a Multiple-Input-Multiple-Output (MIMO) radar antenna comprising a plurality of Transmit (Tx) antennas to transmit Tx radar signals, and a plurality of Receive (Rx) antennas to receive Rx radar signals based on the Tx radar signals; and a processor configured to generate the radar information based on input radar data, the input radar data based on the Rx radar signals, wherein the processor is configured to generate the radar information by calibrating an antenna Mismatch (MM) of the MIMO radar antenna in a first dimension of an Azimuth-Elevation domain according to a plurality of one-dimensional (1D) Inverse Coupling Matrices (ICMs), the plurality of 1D ICMs corresponding to a plurality of antenna sub-arrays of the MIMO radar antenna and to a plurality of angles in a second dimension of the Azimuth-Elevation domain, wherein a 1D ICM of the plurality of 1D ICMS corresponds to a combination of an antenna sub-array of the plurality of antenna sub-arrays and an angle of the plurality of angles in the second dimension of the Azimuth-Elevation domain.

24. The vehicle of claim 23 comprising a memory to store one or more 1D ICMs of the plurality of 1D ICMs, the processor configured to retrieve the one or more 1D ICMs from the memory.

25. The vehicle of claim 23, wherein the processor is configured to generate the radar information comprising an Angle of Arrival (AoA) spectrum in the first dimension of the Azimuth-Elevation domain, the processor configured to calibrate the antenna MM of the MIMO radar antenna such that the AoA spectrum has a Peak Side Lobe Level (PSLL) of at least 30 decibel (dB), wherein the PSLL is determined as a difference between a power level of a main-lobe of the AoA spectrum and a power level of a peak side-lobe corresponding to the main-lobe in the AoA spectrum.

* * * * *